US012754960B2

(12) United States Patent
Takayama

(10) Patent No.: US 12,754,960 B2
(45) Date of Patent: Oct. 6, 2026

(54) INFORMATION PROCESSING METHOD, INFORMATION PROCESSING APPARATUS, AND RECORDING MEDIUM

(71) Applicant: CASIO COMPUTER CO., LTD., Tokyo (JP)

(72) Inventor: Yoshihiro Takayama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/187,389

(22) Filed: Mar. 21, 2023

(65) Prior Publication Data

US 2023/0306063 A1 Sep. 28, 2023

(30) Foreign Application Priority Data

Mar. 23, 2022 (JP) ................................. 2022-046275

(51) Int. Cl.

*G06F 16/908* (2019.01)
*G06F 3/04817* (2022.01)
*G06F 3/04847* (2022.01)
*G06F 3/0488* (2022.01)

(52) U.S. Cl.

CPC ........ *G06F 16/908* (2019.01); *G06F 3/04817* (2013.01); *G06F 3/04847* (2013.01); *G06F 3/0488* (2013.01)

(58) Field of Classification Search

CPC . G06F 3/04817; G06F 3/04847; G06F 3/0488
See application file for complete search history.

(56) References Cited

U.S. PATENT DOCUMENTS 10,515,140 B1 * 12/2019 Scott ........................ G06F 3/048
2010/0030612 A1 * 2/2010 Kim .................. H04M 1/72451 701/410
2011/0022310 A1 * 1/2011 Ishii .................... G06F 3/04886 715/781
2011/0050726 A1 * 3/2011 Suehiro .............. H04N 1/00175 345/635
2011/0126155 A1 * 5/2011 Krishnaraj ............ G06F 16/743 715/810

(Continued)

FOREIGN PATENT DOCUMENTS

JP S63292263 A 11/1988
JP H0744538 A 2/1995

(Continued)

*Primary Examiner* — Kuen S Lu

(74) *Attorney, Agent, or Firm* — Scully, Scott, Murphy & Presser, P.C.

(57) ABSTRACT

An information processing method is an information processing method to be executed by an information processing apparatus including a memory storing a program and a processor, wherein the processor executes the program to perform operations including: performing control to display, on a display, a slider including an icon associated with a product registered by a user, on a list information about products; causing the slider to operate based on an operation of the slider by the user and moving the icon according to the operation of the slider; and transitioning, in response to selection of the icon, to information about the product registered by the user associated with the icon.

19 Claims, 16 Drawing Sheets

(56) References Cited

U.S. PATENT DOCUMENTS

| | | | | |
|---|---|---|---|---|
| 2013/0054863 | A1* | 2/2013 | Imes | H04L 12/2827 709/223 |
| 2014/0306976 | A1* | 10/2014 | Sugiura | G06F 16/51 345/530 |
| 2015/0084515 | A1* | 3/2015 | Altamura | H05B 47/175 315/131 |
| 2015/0301597 | A1* | 10/2015 | Rogers | G06Q 30/00 345/156 |
| 2016/0005229 | A1* | 1/2016 | Lee | G06T 11/60 345/419 |
| 2016/0260244 | A1* | 9/2016 | Moravec | G06T 15/50 |
| 2018/0247361 | A1* | 8/2018 | Tsuboi | G06Q 30/0201 |
| 2022/0147241 | A1* | 5/2022 | Seo | G06F 3/04845 |
| 2022/0270166 | A1* | 8/2022 | Naaman | G06Q 30/0206 |

FOREIGN PATENT DOCUMENTS

| | | | |
|---|---|---|---|
| JP | 2006285471 | A | 10/2006 |
| JP | 2009175807 | A | 8/2009 |
| JP | 2011185911 | A | 9/2011 |

* cited by examiner

INFORMATION PROCESSING METHOD, INFORMATION PROCESSING APPARATUS, AND RECORDING MEDIUM

CROSS-REFERENCE TO RELATED APPLICATION

This application claims the benefit of Japanese Patent Application No. 2022-046275, filed on Mar. 23, 2022, the entire disclosure of which is incorporated by reference herein.

FIELD

The present disclosure relates to an information processing method, an information processing apparatus, and a recording medium.

BACKGROUND

Conventionally, a technique of displaying information on a scroll bar is known as means for quickly searching for information that is not displayed on a display screen. For example, Unexamined Japanese Patent Application Publication No. 2011-185911 that is a patent document of Japan discloses a technique of displaying an occurrence position of an alarm on a signal waveform on a scroll bar and capable of searching the occurrence position of the alarm even if the signal waveform of the occurrence position of the alarm is not displayed on the display screen.

SUMMARY

An information processing method according to the present disclosure is an information processing method to be executed by an information processing apparatus including a memory storing a program and a processor,

- wherein the processor executes the program to perform operations including:
- performing control to display, on a display, a slider including an icon associated with a product registered by a user, on a list information about products;
- causing the slider to operate based on an operation of the slider by the user and moving the icon according to the operation of the slider; and
- transitioning, in response to selection of the icon, to information about the product registered by the user associated with the icon.

BRIEF DESCRIPTION OF THE DRAWINGS

A more complete understanding of this application can be acquired when the following detailed description is considered in conjunction with the following drawings, in which.

DETAILED DESCRIPTION

Figure 1:
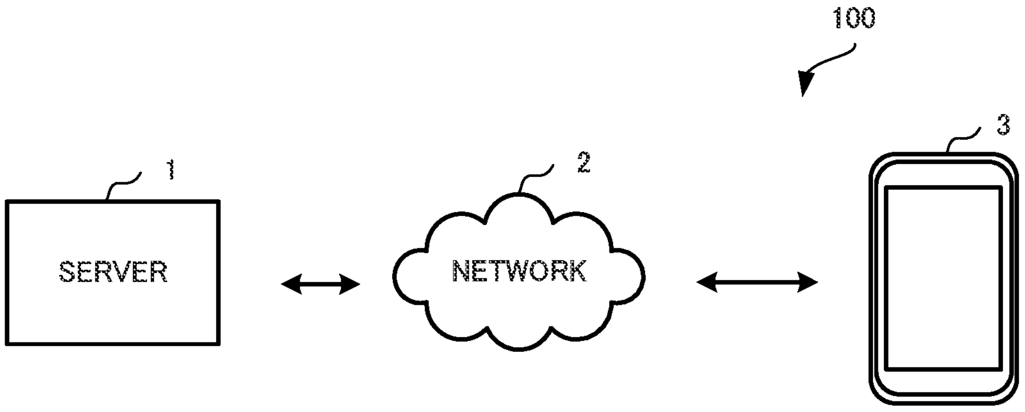
FIG. 1 is a drawing illustrating an example of a configuration of an information processing system according to an embodiment of the present disclosure.

Hereinafter, an embodiment of the present disclosure is described in detail with reference to the drawings. The same reference numerals are given to the same or corresponding parts in the drawings.

A terminal apparatus 3 according to the embodiment of the present disclosure has a function for displaying an icon that indicates a product possessed by a user on a slider to make it easy to find the posting position of the product that the user possesses on a catalogue that describes list information about multiple products. In the present embodiment, the product displayed on the catalogue is, for example, a wrist watch.

FIG. 1 is a diagram illustrating a configuration of an information processing system 100 including the terminal apparatus 3. The information processing system 100 includes a server 1 and a terminal apparatus 3 communicably connected to the server 1 via a network 2. The network 2 is a communication network that connects the server 1 and the terminal apparatus 3 so that the server 1 and the terminal apparatus 3 can communicate with each other. The network 2 is, for example, the Internet.

Figure 2:
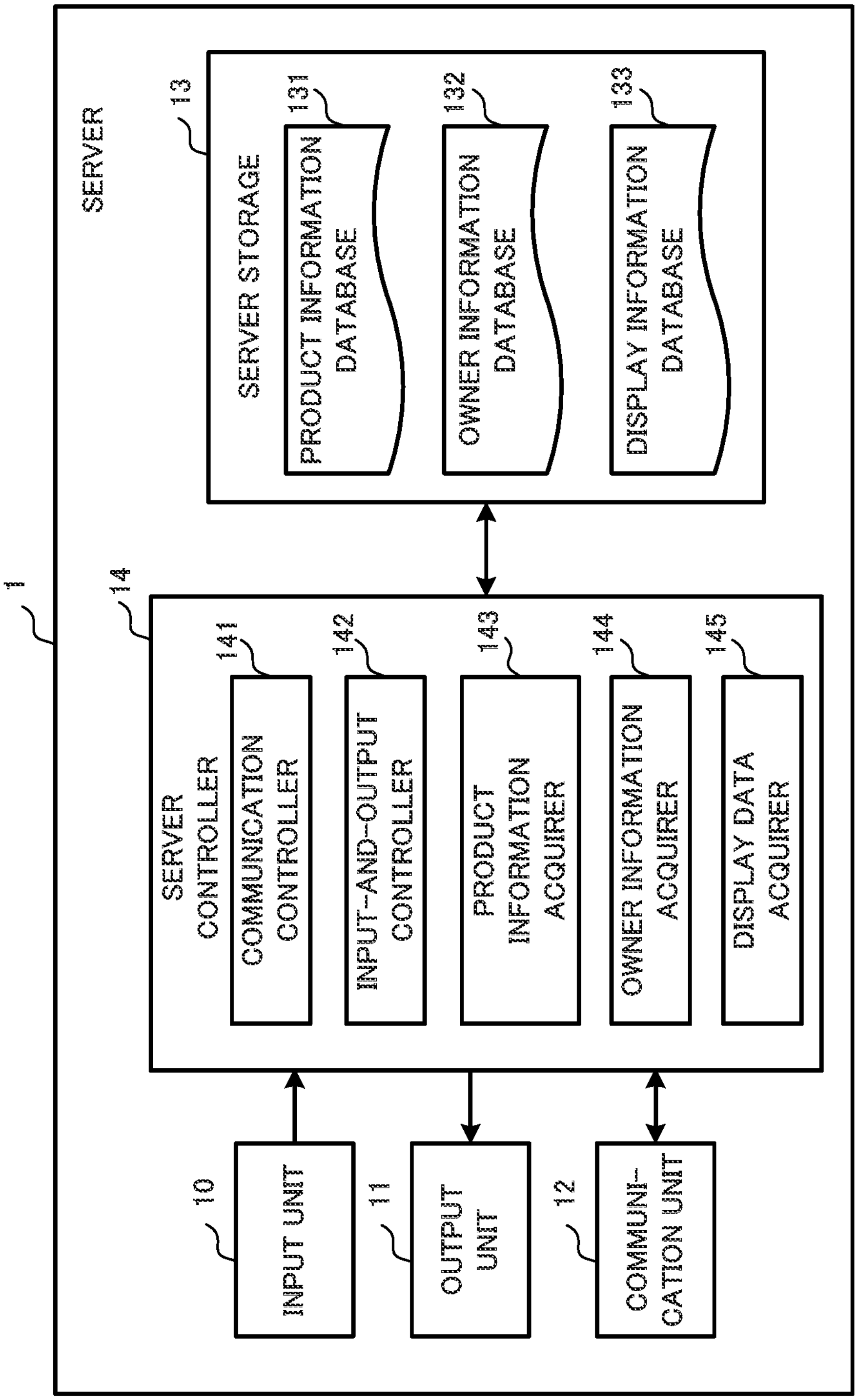
FIG. 2 is a diagram illustrating a configuration of a server according to the embodiment of the present disclosure.

Next, the configuration of server 1 is explained below with reference to FIG. 2. The server 1 stores various data for catalogue to be displayed on the display screen of the terminal apparatus 3, and sends various data to the terminal apparatus 3 in response to requests from the terminal apparatus 3. The server 1 includes an input unit 10, an output unit 11, a communication unit 12, a server storage 13, and a server controller 14, as illustrated in FIG. 2.

The input unit 10 enters various data to be stored in the server storage 13 of the server 1, instructions from the user, and the like. The output unit 11 presents various data that is entered from the input unit 10, various functions of the server 1, and the like to the user.

The communication unit 12 communicates with the terminal apparatus 3 via the network 2 as illustrated in FIG. 1.

The server storage 13 stores various data entered from the input unit 10, programs for executing various functions of the server 1, and the like. The server storage 13 also includes a product information database 131, an owner information database 132, and a display information database 133. The product information database 131 is a database that stores information about all released products. In the product information database 131, a product name, a model number, specifications, a thumbnail image illustrating the appearances of the product, and the like are summarized and stored for each product.

The owner information database 132 is a database that stores various information registered by the user when the product is purchased. The user can enter user information from dedicated user registration site when the product is purchased. Various types of information entered on this dedicated user registration site are stored in the owner information database 132. The display information database 133 is a database that stores various data such as images, character strings, style sheets, and the like to be displayed on the display screen of the terminal apparatus 3 as illustrated in FIG. 1.

Also, the server controller 14 executes various functions based on the programs stored in the server storage 13. The server controller 14 includes a communication controller 141, an input-and-output controller 142, a product information acquirer 143, an owner information acquirer 144, and a display data acquirer 145.

The communication controller 141 controls communication with the terminal apparatus 3 via the network 2 as illustrated in FIG. 1. The input-and-output controller 142 controls the operation of the server 1 according to various inputs from the input unit 10. Also, the input-and-output controller 142 controls the output of various data to the output unit 11. Furthermore, the input-and-output controller 142 performs control to receive various data from the terminal apparatus 3 via the network 2 or output various data to the terminal apparatus 3 via the network 2.

The product information acquirer 143 acquires data of product information from the product information database 131 of the server storage 13. The owner information acquirer 144 acquires from the owner information database 132 of the server storage 13 various information registered by the user when the product was purchased. The display data acquirer 145 acquires from the display information database 133 of the server storage 13 various data such as images, character strings, style sheets, and the like to be displayed on the display screen of the terminal apparatus 3 as illustrated in FIG. 1.

Figure 3:
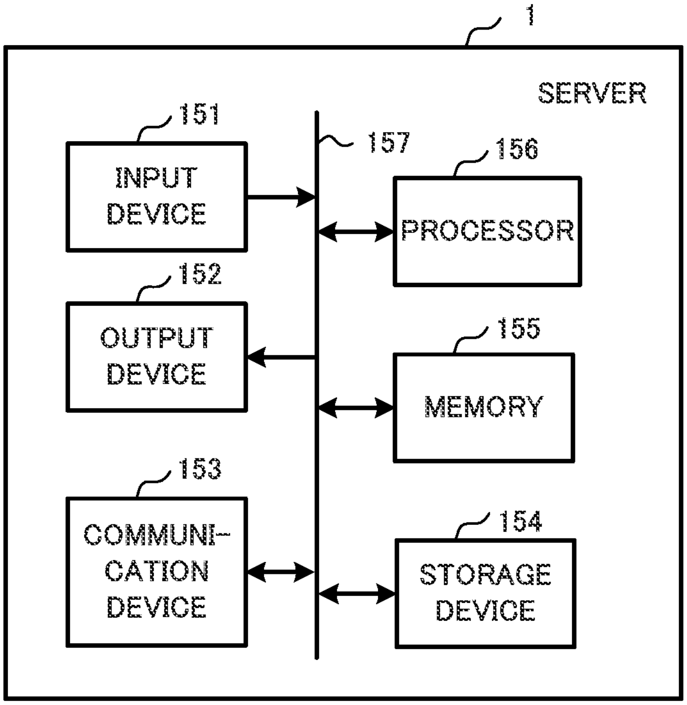
FIG. 3 is a diagram illustrating an example of a hardware configuration of the server as illustrated in FIG. 2.

Each function included in the server controller 14 is implemented by executing a program stored in the server storage 13. The hardware configuration of the server 1 for executing the program is described below with reference to FIG. 3.

The server 1 includes an input device 151, an output device 152, a communication device 153, a storage device 154, a memory 155, and a processor 156. The input device 151, the output device 152, the communication device 153, the storage device 154, the memory 155, and the processor 156 are interconnected via a bus 157.

The input device 151 is a device that receives input from the user. The input device 151 can be constituted by a device capable of entering data, such as a keyboard, a mouse, a tablet, and the like. The output device 152 is a device that presents various data entered from the input device 151, various functions of the server 1, and the like to the user. The output device 152 can be structured using a display apparatus such as a liquid crystal display (LCD) or an organic electroluminescence (EL) monitor.

The communication device 153 communicates with the terminal apparatus 3 via the network 2 as illustrated in FIG. 1 to transmit and receive various data. The communication device 153 can be constituted by various devices with a communication method connectable to the network 2, such as a wired or wireless LAN. The storage device 154 is a device that stores various programs executed by the processor 156 and various data entered from the input device 151. The storage device 154 can be structured using, for example, a storage apparatus such as a hard disk drive (HDD) or a solid state drive (SSD).

The memory 155 is a storage device to which various programs stored in the storage device 154 are extracted. The memory 155 can be structured using, for example, a storage device and a storage medium such as random access memory (RAM), a volatile or non-volatile semiconductor memory such as a flash memory. The processor 156 reads various programs stored in the storage device 154, extracts the various programs to the memory 155, and executes the various programs. The processor 156 can be structured using a processing apparatus such as a central processing unit (CPU) or a micro-processing unit (MPU).

Next, the configuration of the terminal apparatus 3 is explained below with reference to FIG. 4. The terminal apparatus 3 causes the display unit 36 to display a catalogue containing multiple products based on various data received from the server 1 as illustrated in FIG. 1. The terminal apparatus 3 is a small portable electronic device, such as a smart phone, tablet, and the like. It should be noted that the terminal apparatus 3 is hereinafter described as, for example, a smart phone.

The terminal apparatus 3 includes an image-capture unit 31, an audio input-and-output unit 32, an operation input unit 33, a communication unit 34, a terminal storage 35, a display unit 36, and a terminal controller 37. The image-capture unit 31 captures still images or moving images. The audio input-and-output unit 32 inputs and outputs audio. The audio input-and-output unit 32 can, for example, acquire the audio of a voice call, and output music received from the outside via the network 2 as illustrated in FIG. 1.

The operation input unit 33 can input operations from the user. The communication unit 34 communicates with the server 1 and an external apparatus via the network 2 as illustrated in FIG. 1. The terminal storage 35 stores various programs executed by the terminal apparatus 3, various data received from the server 1, and the like. The terminal storage 35 contains a product information database 351, an owner information database 352, and a display information database 353.

The product information database 351 is a database that stores information about all released products acquired from the product information database 131 of the server storage 13 as illustrated in FIG. 2. In the product information database 351, a product name, a model number, specifications, a thumbnail image illustrating the appearances of the product, and the like are summarized and stored for each product.

The owner information database 352 is a database that stores various information registered by the user when the product is purchased, which are acquired from the owner information database 132 of the server storage 13 as illustrated in FIG. 2. The display information database 353 is a database that stores various data such as images, character strings, style sheets, and the like to be displayed on the display screen of the display unit 36, which are acquired from the display information database 133 of the server storage 13 as illustrated in FIG. 2.

The display unit 36 displays on the display screen a catalogue containing multiple products, which is generated based on various data stored in the display information database 353 of the terminal storage 35. Also, the display unit 36 displays on the display screen the display contents according to the operation entered by the user from the operation input unit 33.

The terminal controller 37 performs various functions based on programs stored in the terminal storage 35. The terminal controller 37 includes a communication controller 371, an input-and-output controller 372, a product information acquirer 373, an owner information acquirer 374, and a display information generator 375.

The communication controller 371 controls communication with the server 1 via the network 2 as illustrated in FIG. 1. The input-and-output controller 372 controls the operation of the terminal apparatus 3 according to various inputs entered from the operation input unit 33. Also, the input-and-output controller 372 performs control to receive various data via the network 2 from the server 1 as illustrated in FIG. 2, or output various data via the network 2 to the server 1.

The product information acquirer 373 acquires, via the network 2, data of product information from the product information database 131 of the server storage 13 as illustrated in FIG. 2. The product information acquirer 373 stores the acquired data of the product information to the product information database 351 of the terminal storage 35.

The owner information acquirer 374 acquires, via the network 2, various information data registered by the user when the product was purchased from the owner information database 132 of the server storage 13 as illustrated in FIG. 2. The owner information acquirer 374 stores the acquired data of various information to the owner information database 352 of the terminal storage 35.

The display information generator 375 acquires various data such as images, character strings, style sheets, and the like from the display information database 133 of the server storage 13 as illustrated in FIG. 2 via the network 2. Then, the display information generator 375 generates display data for a catalogue containing multiple products, based on the acquired various data. In addition, the display information generator 375 stores the acquired various data in the display information database 353 of the terminal storage 35.

The terminal apparatus 3 is an example of an information processing apparatus of the claims. Also, the terminal controller 37 is an example of a controller of the claims.

Each function included in the terminal controller 37 is implemented by executing a program stored in the terminal storage 35. The hardware configuration of the terminal apparatus 3 for executing the program is described below with reference to FIG. 5.

The terminal apparatus 3 includes an input-and-output port 381, a communication device 382, a storage device 383, a display device 384, a display controller 385, a memory 386, and a processor 387. The input-and-output port 381, the communication device 382, the storage device 383, the display device 384, the display controller 385, the memory 386, and the processor 387 are interconnected via a bus 388.

The input-and-output port 381 is a port that connects the image-capture unit 31, the audio input-and-output unit 32, and the operation input unit 33, and is configured to enable data transmission/reception. The image-capture unit 31 can be structured using, for example, a camera, a video camera, or the like using an image-capture device such as a charge coupled device (CCD), a complementary metal oxide semiconductor (CMOS) image sensor, or the like.

The audio input-and-output unit 32 can be constituted by, for example, a speaker for outputting audio received in a voice call, music data acquired from the outside via the communication unit 34, and a microphone capable of acquiring the audio of the user. The operation input unit 33 can be structured using a device capable of touch input, such as a tablet and a digitizer.

The communication device 382 includes a data communication unit that communicates with the server 1 via the network 2 as illustrated in FIG. 1, and a voice communication unit that transmits and receives radio signals for telephone communication with a base station, not illustrated. Note that the data communication unit can also communicate with an external server other than server 1, a cloud, and the like. The data communication unit can be structured using, for example, wireless LAN, Wi-fi (registered trademark), Bluetooth (registered trademark), and the like. Also, the voice communication unit can be structured using a communication device for transmitting and receiving radio signals for telephone communication to and from the base station.

Figure 4:
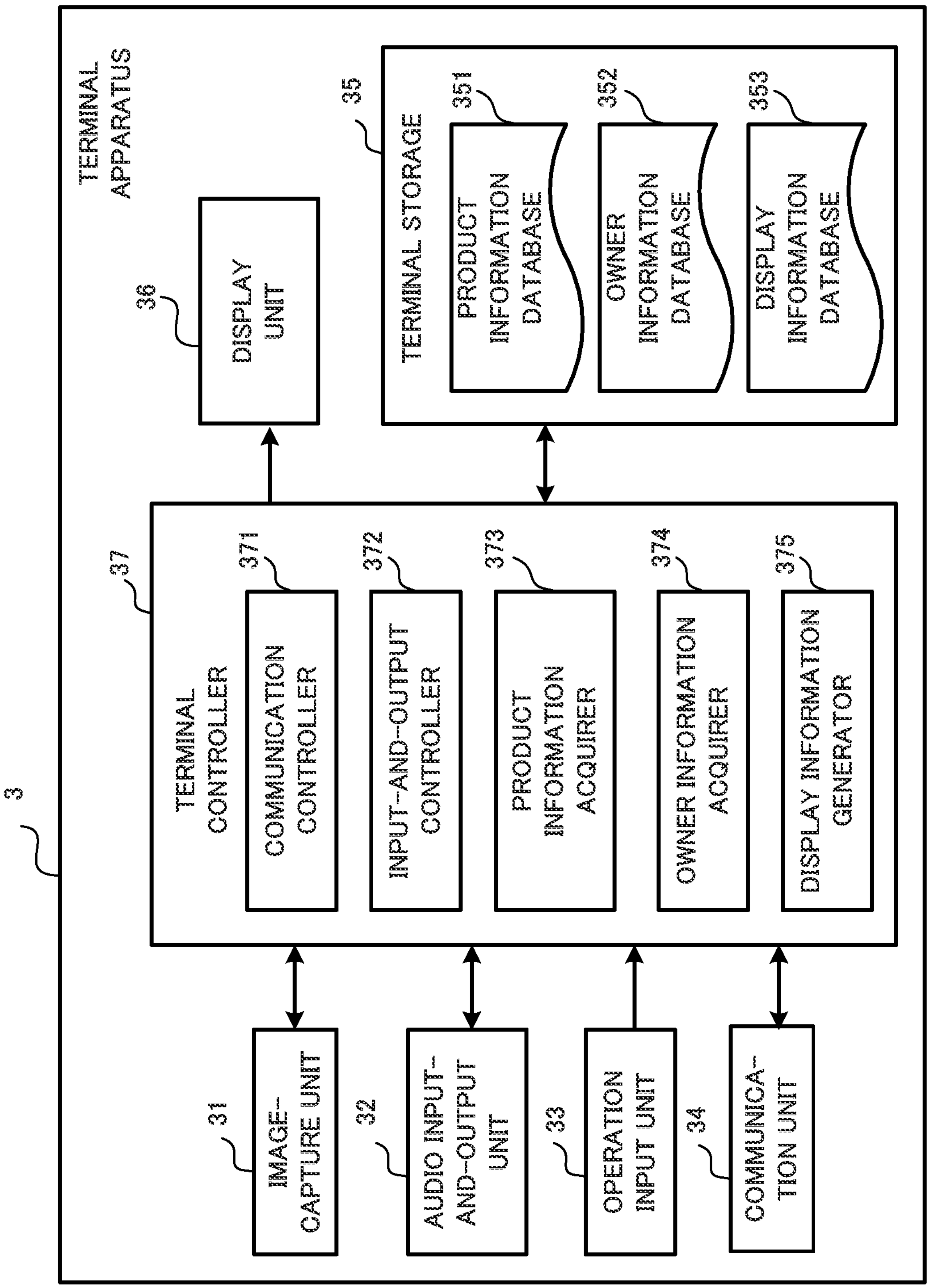
FIG. 4 is a diagram illustrating a configuration of a terminal apparatus according to the embodiment of the present disclosure.

The storage device 383 is a device for storing various programs executed by the processor 387 and various data contained in each database as illustrated in FIG. 4. The storage device 383 can be structured using, for example, a storage apparatus such as an HDD or an SSD, a non-volatile storage device, or the like.

The display device 384 is a device that displays a catalogue containing multiple products generated by the display information generator 375 of the terminal controller 37 as illustrated in FIG. 4 and a display content according to the operation of the user entered from the operation input unit 33. The display device 384 can be structured using a display apparatus such as an LCD or an organic EL monitor. In the present embodiment, a function as a touch panel that serves both as an input unit and a display unit can be achieved by placing the operation input unit 33 on the display device 384.

The display controller 385 is a controller that outputs various display data to the display device 384. The display controller 385 can be structured using, for example, a video signal output apparatus such as a video card, a graphics processing unit (GPU), a graphic board or the like.

In the memory 386, various programs read from storage device 383 are extracted. The memory 386 can be structured using a storage device and a storage medium such as RAM, volatile or non-volatile semiconductor memory such as flash memory. The processor 387 reads various programs stored in the storage device 383, extracts the various programs to the memory 386, and executes the various programs. The processor 387 can be constructed using a processing apparatus such as a CPU, an MPU, or the like.

Figure 6:
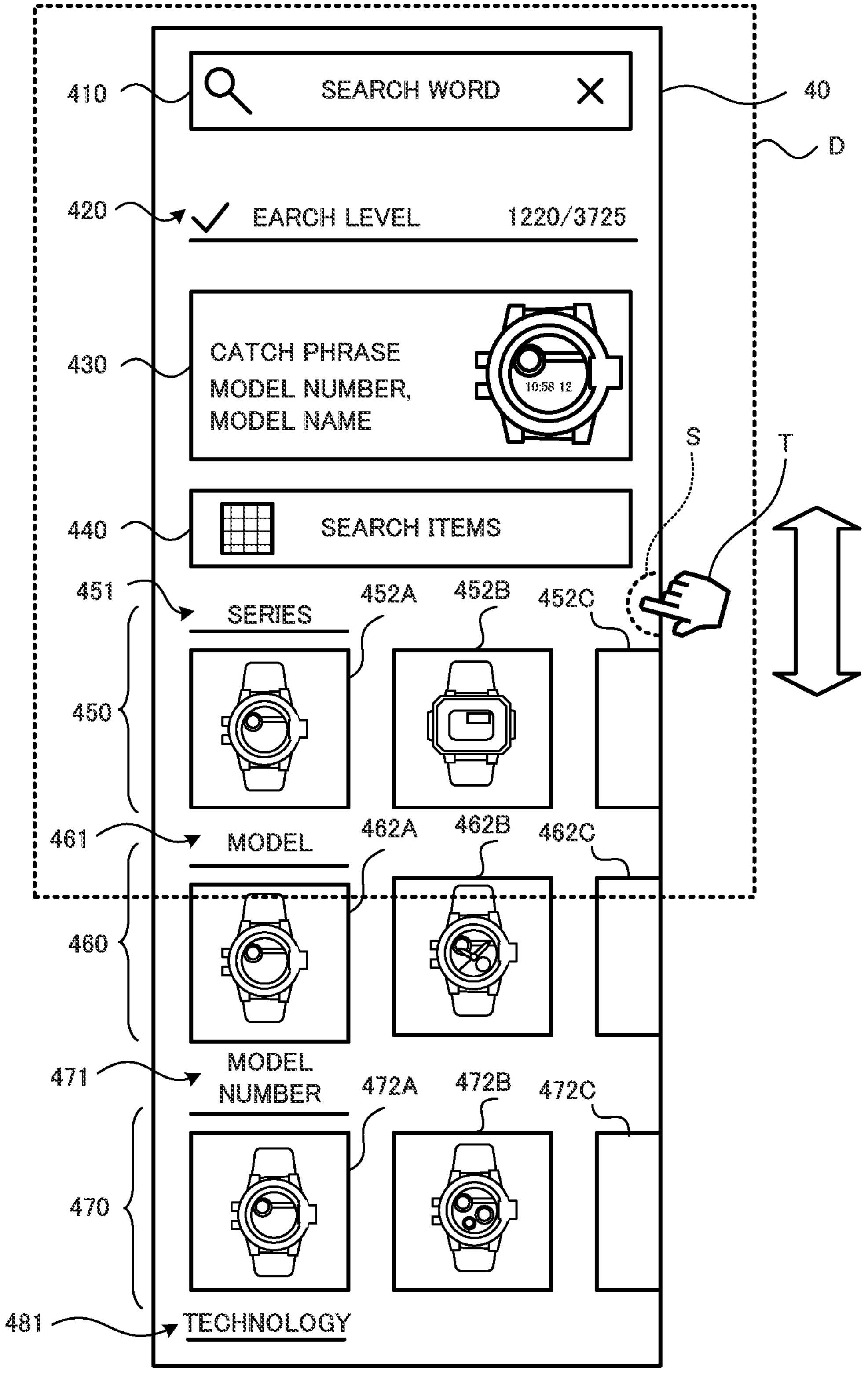
FIG. 6 is a diagram illustrating a configuration of a start screen of a catalogue application according to the embodiment of the present disclosure.

Next, the configuration of the display screen of the catalogue according to the present embodiment is explained below with reference to FIG. 6 to FIG. 11. The user can start the application and view the catalogue by tapping an icon of the catalogue application placed on the display screen of the display unit 36 of the terminal apparatus 3 as illustrated in FIG. 4. FIG. 6 is a diagram illustrating a configuration of a startup screen 40 displayed on the display screen of the display unit 36 by the catalogue application.

The startup screen 40 includes a search word input unit 410, a search level display unit 420, a pickup function display unit 430, a search item input unit 440, a first category display unit 450, a second category display unit 460, and a third category display unit 470. The search word input unit 410 is an interface through which the product name, series name, model number, and the like can be entered. The search word input unit 410 receives a search word from the operation input unit 33. Then, the terminal controller 37 can search for a corresponding product by performing search using the word.

The search level display unit 420 displays the total number of products and the number of products viewed users. In the example of FIG. 6, the number of products viewed by users is 1220, and the total number of products is 3725. The catalogue according to the present embodiment illustrates how many products in a certain group of products have been viewed by users. This allows the user to find his or her product viewing situation. In other words, the difference between the total number of products and the number of viewed products represents the number of products not viewed by users. The search level according to the present embodiment indicates how many products have been viewed out of a certain number of products. This allows the user to find interesting products among the products that the user has not yet seen.

The pickup function display unit 430 displays the topic of the product. The pickup function display unit 430 displays, for example, a catchphrase indicating the features of the product, the model number, the model name of the product, a thumbnail image illustrating the appearance of the product, and the like. The catchphrases are, for example, "the first color model in the series", "the model used as an ice hockey puck in a TV commercial", and the like.

With the search item input unit 440, when the user enters the series name, the model name, and the like of the product, undiscovered products of the user can be searched from among the series name, model name, and the like. Each of the first category display unit 450, the second category display unit 460, and the third category display unit 470 presents products by category. Note that "undiscovered" products here indicates products that have not yet been viewed by the user in the catalogue of the present embodiment.

The first category display unit 450 includes a first category item name 451 and first category model icons 452A, 452B, and 452C. In the following, the first category model icons 452A, 452B, and 452C are hereinafter collectively referred to as a first category model icon 452.

The first category item name 451 is the category name of products displayed in the first category. Here, in the first category item name 451, for example, as illustrated in FIG. 6, "series" is displayed as the category name of products. The first category model icon 452 displays, as an icon, a thumbnail image indicating the appearance of the model belonging to the first category.

The second category display unit 460 includes a second category item name 461 and second category model icons 462A, 462B, and 462C. In the following, the second category model icons 462A, 462B, and 462C are hereinafter collectively referred to as a second category model icon 462.

The second category item name 461 is the category name of products displayed in the second category. Here, in the second category item name 461, for example, as illustrated in FIG. 6, "model" is displayed as the category name of products. The second category model icon 462 displays, as an icon, a thumbnail image indicating the appearance of the model belonging to the second category.

The third category display unit 470 includes a third category item name 471 and third category model icons 472A, 472B, and 472C. In the following, the third category model icons 472A, 472B, and 472C are hereinafter collectively referred to as a third category model icon 472.

The third category item name 471 is the category name of products displayed in the third category. Here, in the third category item name 471, for example, as illustrated in FIG. 6, "model number" is displayed as the category name of products. The third category model icon 472 displays, as an icon, a thumbnail image indicating the appearance of the model belonging to the third category.

It is also assumed that the startup screen 40 is made larger than the size of the display screen of the display unit 36. A displayable frame D indicated by dotted lines of FIG. 6 indicates a displayable range on the display screen of the display unit 36 of the terminal apparatus 3. Here, a contact range S is a finger(s) T of the user that comes into contact with the display screen of the display unit 36 of the terminal apparatus 3. When the user moves the finger(s) T in the direction of the arrow while keeping the finger(s) T in contact with the display screen of the display unit 36, the contact range S moves along with the movement. The displayable frame D moves according to the direction in which the contact range S moves. This makes it possible to change the display range of the startup screen 40 displayed on the display screen of the display unit 36 of the terminal apparatus 3.

The search level display unit 420, the pickup function display unit 430, the search item input unit 440, the first category model icon 452 of the first category display unit 450, the second category model icon 462 of the second category display unit 460, the third category model icon 472 of the third category display unit 470 included in the startup screen 40 are tapped by the finger(s) T of the user, the screen transitions to a screen that is different from the startup screen 40.

Figure 7:
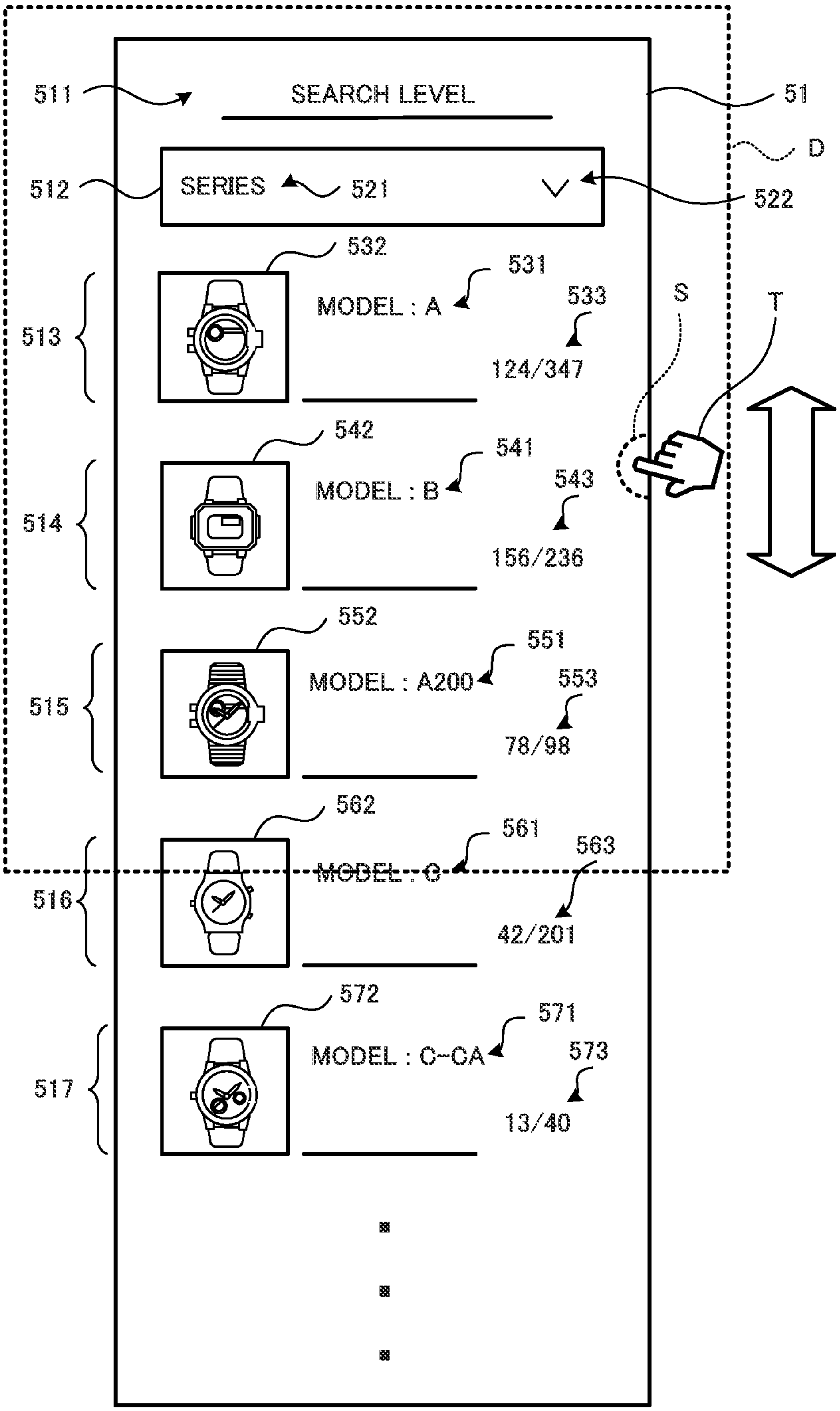
FIG. 7 is a diagram illustrating a configuration of a search level display screen of a catalogue application according to the embodiment of the present disclosure.

First, when the search level display unit 420 included in the startup screen 40 is tapped by the finger(s) T of the user, the startup screen 40 transitions to the search level list screen 51 as illustrated in FIG. 7. The search level list screen 51 includes a screen name display unit 511, a screen category name selection unit 512, a first search level display unit 513, a second search level display unit 514, a third search level display unit 515, a fourth search level display unit 516, and a fifth search level display unit 517. The screen name display unit 511 displays the screen name of the search level list screen 51. In this case, the screen name display unit 511 displays, for example, "search level" as illustrated in FIG. 7.

The screen category name selection unit 512 selects the category name of the product for which the search level is displayed. The screen category name selection unit 512 includes a selection category name display unit 521 and a selection item presenting unit 522. When the selection item presenting unit 522 is tapped with the finger(s) of the user, the selection item presenting unit 522 presents the category names of the multiple products as selection items to the user. Among the presented selection items, the category name of products selected by the user is displayed in the selection category name display unit 521. Here, the selection category name display unit 521 is, for example, "series" as illustrated in FIG. 7.

Also, in accordance with the category name of the product selected by the selection item presenting unit 522, the search level of each product is displayed in each of the first search level display unit 513, the second search level display unit 514, the third search level display unit 515, the fourth search level display unit 516, and the fifth search level display unit 517. The first search level display unit 513 includes a first search level category name display unit 531, a first search level icon 532, and a first search result display unit 533.

The first search level category name display unit 531 displays lower classification names included in the category name of the products displayed in the selection category name display unit 521. Here, for example, as illustrated in FIG. 7, the first search level category name display unit 531 displays a classification name "MODEL: A" under the "series" displayed in the selection category name display unit 521. The first search level icon 532 displays, as an icon, a thumbnail image indicating the appearance of the model belonging to the first search level category name. The first search result display unit 533 displays the search level of the product linked to the first search level category name.

The second search level display unit 514 also includes a second search level category name display unit 541, a second search level icon 542, and a second search result display unit 543. Here, for example, as illustrated in FIG. 7, the second search level category name display unit 541 displays a classification name "MODEL: B" under the "series" displayed in the selection category name display unit 521.

The third search level display unit 515 also includes a third search level category name display unit 551, a third search level icon 552, and a third search result display unit 553. Here, for example, as illustrated in FIG. 7, the third search level category name display unit 551 displays a classification name "MODEL: A200" under the "series" displayed in the selection category name display unit 521.

The fourth search level display unit 516 includes a fourth search level category name display unit 561, a fourth search level icon 562, and a fourth search result display unit 563. Here, for example, as illustrated in FIG. 7, the fourth search level category name display unit 561 displays a classification name "MODEL: C" under the "series" displayed in the selection category name display unit 521.

The fifth search level display unit 517 includes a fifth search level category name display unit 571, a fifth search level icon 572, and a fifth search result display unit 573. Here, for example, as illustrated in FIG. 7, the fifth search level category name display unit 571 displays a classification name "MODEL: C-CA" under the "series" displayed in the selection category name display unit 521.

The second search level icon 542 to the fifth search level icon 572 are also similar to the first search level icon 532. The second search result display unit 543 to the fifth search result display unit 573 are also similar to the first search result display unit 533.

Figure 8:
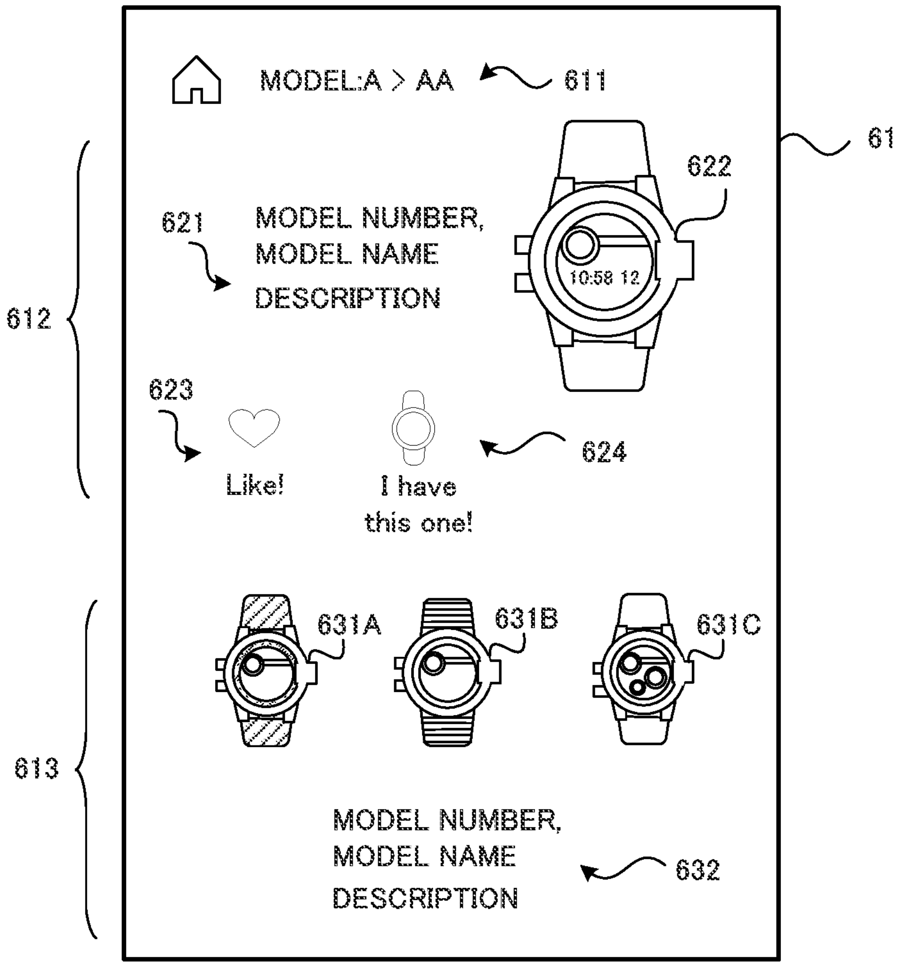
FIG. 8 is a diagram illustrating a configuration of a pickup model display screen of a catalogue application according to the embodiment of the present disclosure.

Next, when the pickup function display unit 430 included in the startup screen 40 as illustrated in FIG. 6 is tapped with the finger(s) T of the user, the startup screen 40 transitions to the pickup model screen 61 as illustrated in FIG. 8. The pickup model screen 61 is a screen that presents the detailed content of the picked up product.

The pickup model screen 61 includes a model series display unit 611, a model content display unit 612, and a similar model display unit 613. The model series display unit 611 indicates the series, group, and the like to which the picked up product belongs. Here, for example, as illustrated in FIG. 8, "MODEL: A>AA" is indicated. "MODEL: A" is a lower classification of the category name "series" of the product as illustrated in FIG. 7. "AA" is a lower classification of "MODEL: A". Therefore, it is known that the picked up product is included in the lower classification "AA" of the series "MODEL: A".

The model content display unit 612 indicates details of the picked up product. The model content display unit 612 includes a product detail display unit 621, a presented product icon 622, a favorite check unit 623, and a possession mark unit 624. The product detail display unit 621 describes not only the model number and the model name of the presented product but also explanation about the function, configuration, and the like of the product. The presented product icon 622 displays a thumbnail image illustrating the appearances of the product.

The favorite check unit 623 has a function that indicates whether the user likes the presented product. For example, when the user likes the presented product, and the user taps the favorite check unit 623, the color, form, and the like of the favorite check unit 623 change. This check result is stored in the owner information database 352 contained in the terminal storage 35 of the terminal apparatus 3 as illustrated in FIG. 4. In addition, according to the check result stored in the owner information database 352, the list screen of the favorite products may be displayed.

The possession mark unit 624 has a function that indicates whether the user is possessing the picked up product. If the product picked up in the owner information database 352 contained in the terminal storage 35 of the terminal apparatus 3 as illustrated in FIG. 4 is stored, it is determined that the user possesses the product. Also, if the product picked up in the owner information database 352 is not stored, it is determined that the user does not possess the product. The color, form, and the like of the possession mark unit 624 are changed depending on whether the user possesses the picked up product.

The similar model display unit 613 displays a product similar to the picked up product. The similar model display unit 613 includes similar model icon 631A, 631B, and 631C and a similar model detail display unit 632. In the following, the similar model icons 631A, 631B, and 631C are hereinafter collectively referred to as a similar model icon 631. The similar model icon 631 displays a thumbnail image illustrating the appearance of the product similar to the picked up product. The similar model detail display unit 632 describes not only the model number and the model name of the similar product but also explanation about the function, configuration, and the like of the product.

Figure 9:
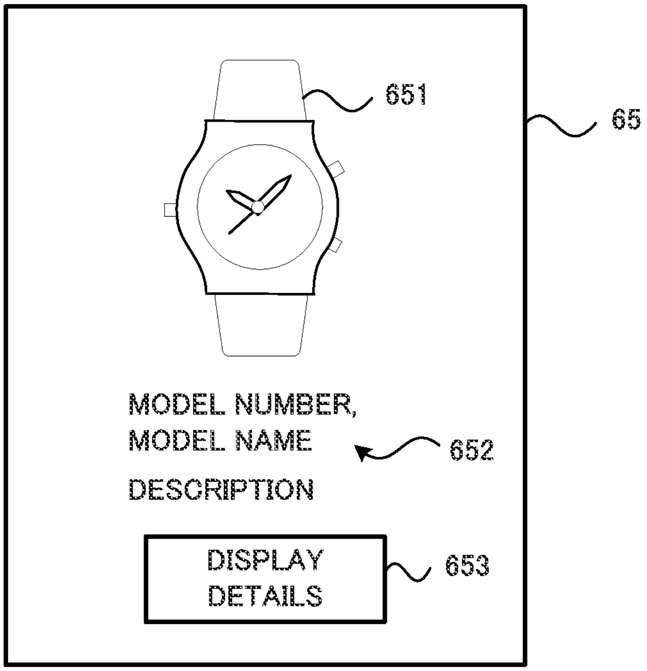
FIG. 9 is a diagram illustrating a configuration of an undiscovered model display screen of the catalogue application according to the embodiment of the present disclosure.

Also, when the series name, the model name, and the like of the product are entered in the search item input unit 440 included in the startup screen 40 as illustrated in FIG. 6, undiscovered products of the user can be searched from among the series name, the model name, and the like. The search result is displayed as an undiscovered model presenting screen 65 as illustrated in FIG. 9. The undiscovered model presenting screen 65 is a screen for presenting undiscovered products to the user. Therefore, the user can see products that he or she has not yet seen, and therefore, the user's willingness to purchase can be aroused.

The undiscovered model presenting screen 65 includes an undiscovered product icon 651, a product summary display unit 652, and a product detail display button 653. The undiscovered product icon 651 displays a thumbnail image of the appearance of the undiscovered product. The product summary display unit 652 is a summary of the undiscovered product, and displays, for example, the model number, model name, and brief description. When the product detail display button 653 is tapped by the finger(s) T of the user, the product detail display button 653 displays a detailed description of the undiscovered product. A detailed explanation of the undiscovered product may be displayed on a separate screen, or may be displayed at the end of the screen of the undiscovered model presenting screen 65.

Next, it is assumed that any one of the first category model icon 452 of the first category display unit 450 to the third category model icon 472 of the third category display unit 470 included in the startup screen 40 as illustrated in FIG. 6 is tapped with the finger(s) T of the user. In this case, the generation-based model display screen 70 that summarizes, based on released era, products associated with the tapped icon is displayed.

Figure 10:
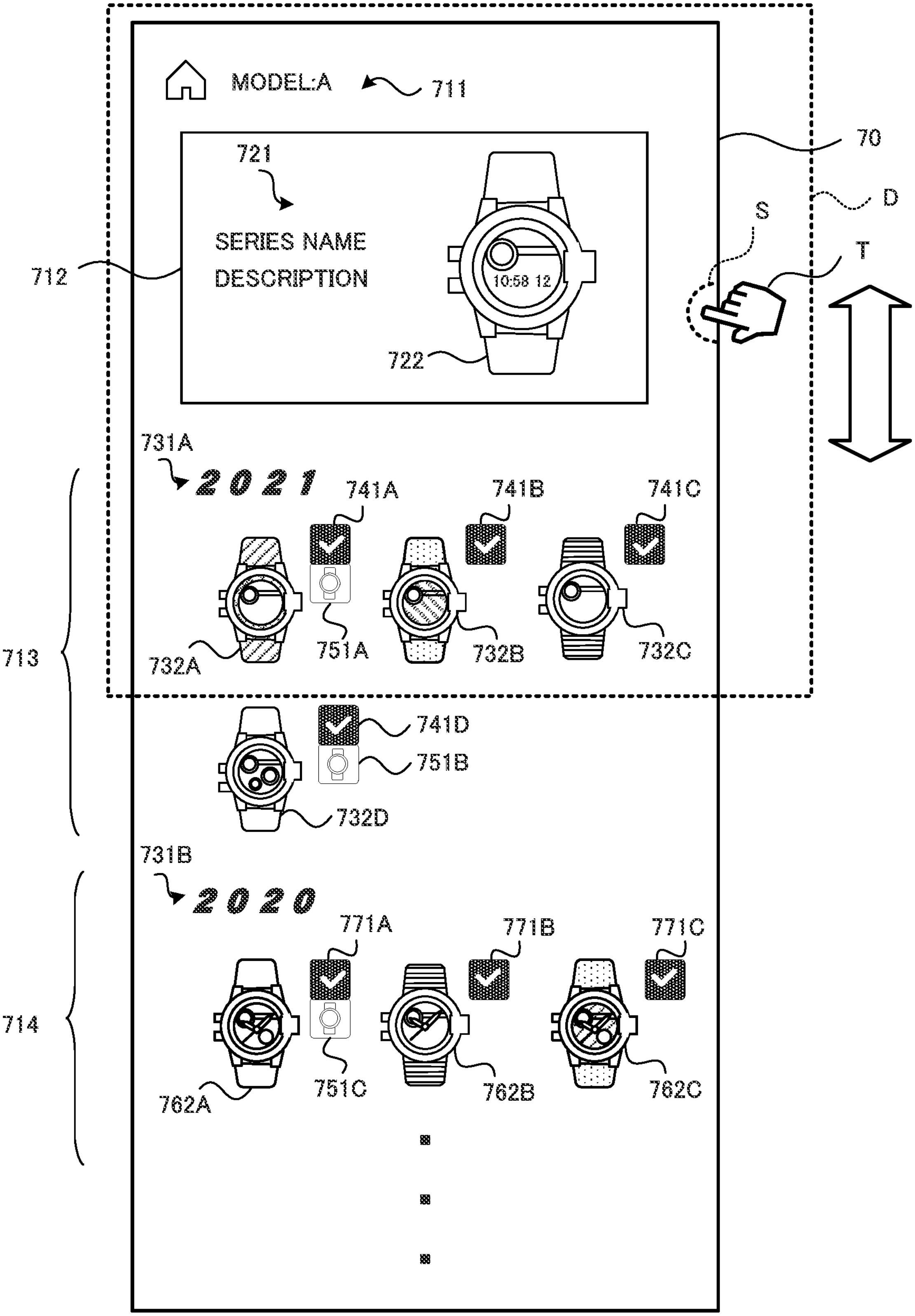
FIG. 10 is a diagram illustrating a configuration of an generation-based model display screen of the catalogue application according to the embodiment of the present disclosure.

For example, it is assumed that, when the first category model icon 452A of the first category display unit 450 included in the startup screen 40 as illustrated in FIG. 6 is tapped with the finger(s) T of the user, the screen transitions to the generation-based model display screen 70 as illustrated in FIG. 10. The generation-based model display screen 70 includes a model-series display unit 711, a representing model display unit 712, a first generation model display unit 713, and a second generation model display unit 714.

The model-series display unit 711 displays the series, group, and the like to which the product model associated with the first category model icon 452A as illustrated in FIG. 6 belongs. In FIG. 6, the first category model icon 452A belongs to the first category display unit 450, and its item name is displayed as “series” in the first category item name 451. Here, for example, “MODEL: A” is indicated as illustrated in FIG. 10. “MODEL: A” is a lower classification of the product category name “series” as illustrated in FIG. 7. Therefore, it can be seen that the product associated with the first category model icon 452A is a product included in the series “MODEL: A”.

The representing model display unit 712 displays a representing example of the product belonging to the series, group, and the like displayed in the model-series display unit 711. The representing model display unit 712 includes a representing model explanation display unit 721 and a representing model icon 722. The representing model explanation display unit 721 describes not only the model number and the model name of the product, which are the representing example, but also explanations about the function, configuration, and the like of the product. Also, the representing model icon 722 displays a thumbnail image indicating the appearance of the product, which is the representing example.

The first generation model display unit 713 displays products sold in a first generation. The first generation model display unit 713 includes a first generation display unit 731A, a first member product icon 732A a second member product icon 732B, a third member product icon 732C, and a fourth member product icon 732D. The first generation display unit 731A displays the year when the product was sold. Here, the first generation display unit 731A is displayed in the western calendar, and is displayed as, for example, “2021” as illustrated in FIG. 10.

The first member product icon 732A to the fourth member product icon 732D display thumbnail images illustrating the appearances of products released in the first generation. As illustrated in FIG. 10, next to the first member product icon 732A, a first user view icon 741A and a first user possession icon 751A are vertically arranged. A second user view icon 741B is provided next to the second member product icon 732B. A third user view icon 741C is provided next to the third member product icon 732C. Next to the fourth member product icon 732D, a fourth user view icon 741D and a second user possession icon 751B are arranged vertically.

The first user view icon 741A to the fourth user view icon 741D indicate whether the products corresponding to the first member product icon 732A to the fourth member product icon 732D have been viewed by the user. For example, in a case where the products corresponding to the first member product icon 732A to the fourth member product icon 732D are not viewed by the user, the first user view icon 741A to the fourth user view icon 741D are grayed out, and a product viewed by the user is displayed in red.

In addition, the first user possession icon 751A indicates that the user possesses the product corresponding to the first member product icon 732A, and the second user possession icon 751B indicates that the user possesses the product corresponding to the fourth member product icon 732D. The first user possession icon 751A and the second user possession icon 751B are displayed according to information about the product possessed by the user, which is stored in the owner information database 352 included in the terminal storage 35 of the terminal apparatus 3 as illustrated in FIG. 4.

Next, the second generation model display unit 714 displays products sold in the second generation. The second generation model display unit 714 includes a second generation display unit 731B, a fifth member product icon 762A, a sixth member product icon 762B, and a seventh member product icon 762C. The second generation display unit 731B displays the year in which the product is sold. Here, the second generation display unit 731B is displayed in the western calendar, and is displayed as, for example, “2020” as illustrated in FIG. 10. In the following, the first generation display unit 731A and the second generation display unit 731B are hereinafter collectively referred to as a generation display unit 731.

The fifth member product icon 762A to the seventh member product icon 762C display thumbnail images indicating the appearances of products released in the second generation. As illustrated in FIG. 10, next to the fifth member product icon 762A, the fifth user view icon 771A and the third user possession icon 751C are vertically arranged. A sixth user view icon 771B is provided next to the sixth member product icon 762B. A seventh user view icon 771C is provided next to the seventh member product icon 762C. In the following, the first user view icon 741A to the fourth user view icon 741D are hereinafter collectively referred to as a user view icon 741. Also, the first user possession icon 751A to the third user possession icon 751C are collectively referred to as a user possession icon 751.

It is assumed that the generation-based model display screen 70 is made larger than the size of the display screen of the display unit 36 of the terminal apparatus 3. A displayable frame D indicated by dotted lines of FIG. 10 indicates a displayable range on the display screen of the display unit 36 of the terminal apparatus 3. When the user moves the finger(s) T in the direction of the arrow while keeping the finger(s) T in contact with the display screen of the display unit 36, the contact range S of the finger(s) T of the user moves along with the movement. The displayable frame D moves according to the direction in which the contact range S moves. This makes it possible to change the display range of the generation-based model display screen 70 displayed on the display screen of the display unit 36 of the terminal apparatus 3.

However, when there are a large number of products, for example, 1000 or more products, displayed on the generation-based model display screen 70, it is difficult for the user to visually find the desired product, and there is a possibility that the user may miss it. Also, when the user confirms the information about the product that the user possesses, he or she cannot immediately reach the product that the user possesses in the generation-based model display screen 70. Therefore, in the present embodiment, by superimposing and displaying a slider with a jump function to an arbitrary position on the generation-based model display screen 70, the user can easily reach the target product.

Figure 11:
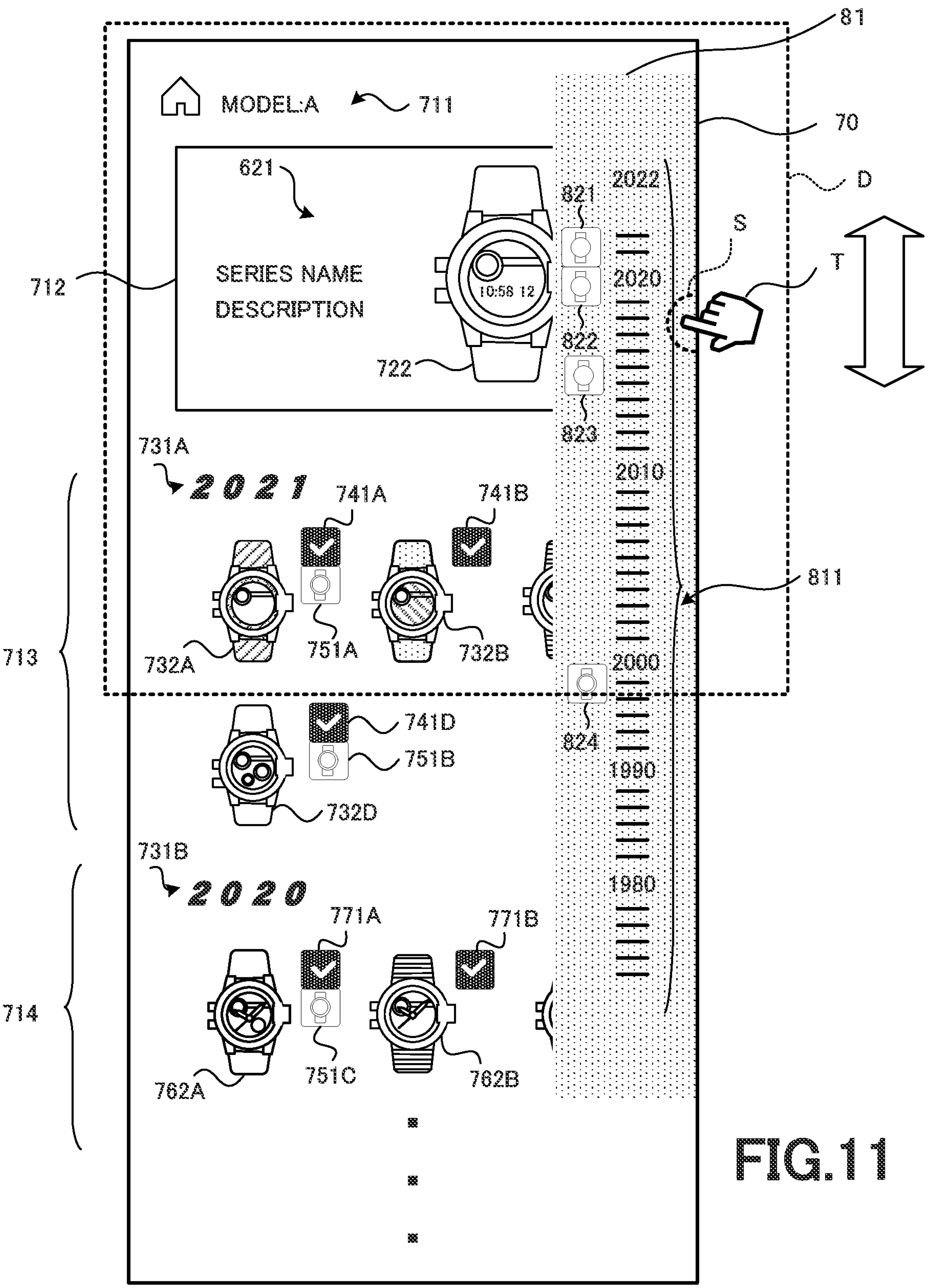
FIG. 11 is a diagram illustrating a configuration of a quick slider displayed on the generation-based model display screen as illustrated in FIG. 10.

In the generation-based model display screen 70 as illustrated in FIG. 10, when the user keeps the finger(s) T in contact with the display screen of the display unit 36 for more than a certain period of time, the quick slider 81 as illustrated in FIG. 11 is superimposed and displayed on the generation-based model display screen 70. The quick slider 81 includes a slider scale unit 811, a first jump icon 821, a second jump icon 822, a third jump icon 823, and a fourth jump icon 824.

The slider scale unit 811 is constituted by numerical values indicating the western calendar, such as 2022 and 2020, and multiple scale lines. The scale line is set in increments of one year in the 2000s and in increments of two years in the 1900s. When the finger(s) T of the user taps the scale line of the slider scale unit 811, the display screen of the generation-based model display screen 70 is displayed with respect to the year associated with the scale line. Also, when the finger(s) T of the user slides on the scale line on the slider scale unit 811 while keeping the finger(s) T in contact with the display screen, the display screen of the generation-based model display screen 70 is displayed with respect to the year associated with the scale line at the position where the finger(s) T of the user has stopped. This allows the user to easily check the display of any given generation.

Also, the first jump icon 821, the second jump icon 822, the third jump icon 823, and the fourth jump icon 824 are icons associated with the products that the user possesses. The first jump icon 821 to the fourth jump icon 824 are provided on the quick slider 81 along the scale line of the slider scale unit 811 corresponding to the date and time when the user purchased the product.

The first jump icon 821 to the fourth jump icon 824 are each associated with the user possession icon 751 displayed on the generation-based model display screen 70. Here, for example, the first jump icon 821 is associated with the first user possession icon 751A, the second jump icon 822 is associated with the second user possession icon 751B, the third jump icon 823 is associated with the third user possession icon 751C, and the fourth jump icon 824 is associated with the fourth user possession icon 751D, not illustrated. Therefore, when the first jump icon 821 to the fourth jump icon 824 are tapped with the finger(s) T of the user, the display screen of the generation-based model display screen 70 displaying the associated product is displayed. As a result, the user can confirm information about the product that the user possesses.

It is also assumed that the quick slider 81 is made larger than the size of the display screen of the display unit 36 of the terminal apparatus 3. A displayable frame D indicated by dotted lines of FIG. 11 indicates a displayable range on the display screen of the display unit 36 of the terminal apparatus 3. When the user performs a sliding operation in the direction of the arrow while keeping the finger(s) T in contact with the display screen of the display unit 36, the contact range S of the finger(s) T of the user moves according to the movement. The displayable frame D moves according to the direction in which the contact range S moves. This makes it possible to change the display range of the quick slider 81 displayed on the display screen of the display unit 36 of the terminal apparatus 3, i.e., the scale line on the slider scale unit 811 and the display range of the first jump icon 821 to the fourth jump icon 824. In this case, only the display range of the quick slider 81 is changed, and the display range of generation-based model display screen 70 on which the quick slider 81 is superimposed is not to be changed.

Hereinafter, the first jump icon 821 to the fourth jump icon 824 are collectively referred to as a jump icon 825. The quick slider 81 may be superimposed and displayed not only on the generation-based model display screen 70 but also on the startup screen 40 as illustrated in FIG. 6, the search level list screen 51 as illustrated in FIG. 7, and the like.

Figure 5:
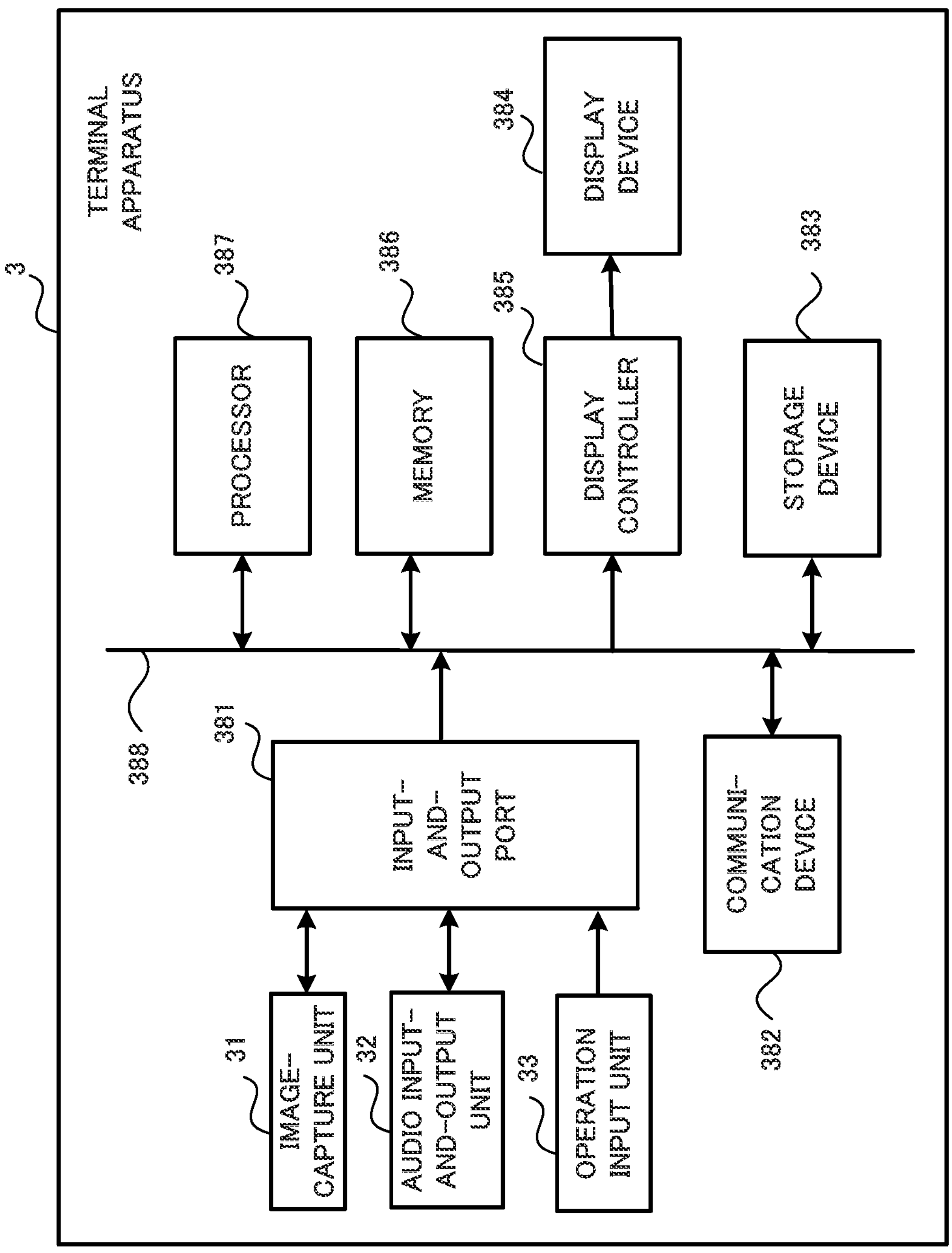
FIG. 5 is a diagram illustrating an example of a hardware configuration of the terminal apparatus as illustrated in FIG. 4.

Next, the screen display processing of the catalogue application according to the present embodiment is explained below with reference to the flowcharts as illustrated in FIG. 12 to FIG. 15. The screen display processing of the catalogue application is stored in the terminal storage 35 of the terminal apparatus 3 as illustrated in FIG. 4 as a screen display processing program. In the display unit 26 of the terminal apparatus 3 as illustrated in FIG. 4, when the user taps the icon of the catalogue application displayed on the display screen, the screen display processing program starts. Specifically, the screen display processing program stored in the storage device 383 of the terminal apparatus 3 as illustrated in FIG. 5 is read, extracted to the memory 386, and executed by the processor 387 of the terminal apparatus 3.

Figure 12:
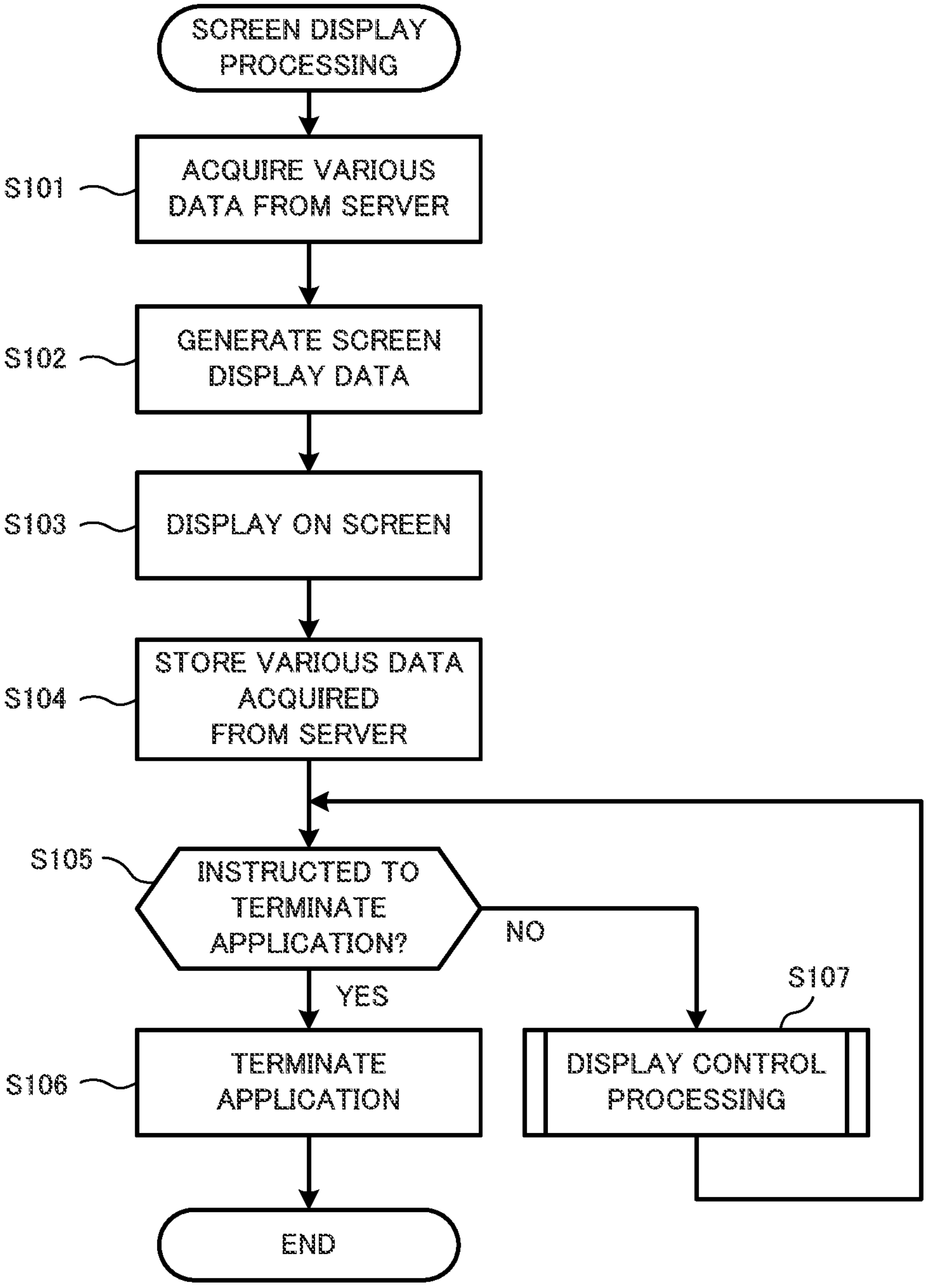
FIG. 12 is a flowchart illustrating a flow of screen display processing executed by the terminal apparatus according to the embodiment of the present disclosure.

In FIG. 12, the terminal controller 37 of the terminal apparatus 3 as illustrated in FIG. 4 acquires various data from the server 1 (step S101). Specifically, the product information acquirer 373 included in the terminal controller 37 of the terminal apparatus 3 acquires data of product information from the product information database 131 included in the server storage 13 of the server 1. The owner information acquirer 374 included in the terminal controller 37 of the terminal apparatus 3 acquires data of owner information from the owner information database 132 included in the server storage 13 of the server 1. The display information generator 375 included in the terminal controller 37 of the terminal apparatus 3 acquires data of display information from the display information database 133 included in the server storage 13 of the server 1.

The display information generator 375 generates screen display data for the startup screen 40 as illustrated in FIG. 6 based on the various data acquired in step S101 (step S102). The display information generator 375 transmits the generated screen display data to the display unit 36 of the terminal apparatus 3 as illustrated in FIG. 4, and displays the startup screen 40 as illustrated in FIG. 6 on the display screen (step S103).

The terminal controller 37 of the terminal apparatus 3 as illustrated in FIG. 4 stores various data acquired from the server 1 in the terminal storage 35 (step S104). Specifically, the product information acquirer 373 contained in the terminal controller 37 of the terminal apparatus 3 as illustrated in FIG. 4 stores various data acquired from the server 1 to the product information database 351 of the terminal storage 35 as illustrated in FIG. 4. The owner information acquirer 374 included in the terminal controller 37 of the terminal apparatus 3 as illustrated in FIG. 4 stores various data acquired from server 1 to the owner information database 352 of terminal storage 35 as illustrated in FIG. 4. The display information generator 375 included in the terminal controller 37 of the terminal apparatus 3 as illustrated in FIG. 4 stores various data acquired from server 1 to the display information database 353 of the terminal storage 35 as illustrated in FIG. 4.

The terminal controller 37 of the terminal apparatus 3 as illustrated in FIG. 4 determines whether there is an instruction to terminate the catalogue application (step S105). For example, the terminal controller 37 of the terminal apparatus 3 determines whether a gesture predetermined to instruct termination of the catalogue application, such as pressing the home button or flicking, is input from the operation input unit 33 of the terminal apparatus 3 as illustrated in FIG. 4.

Figure 13:
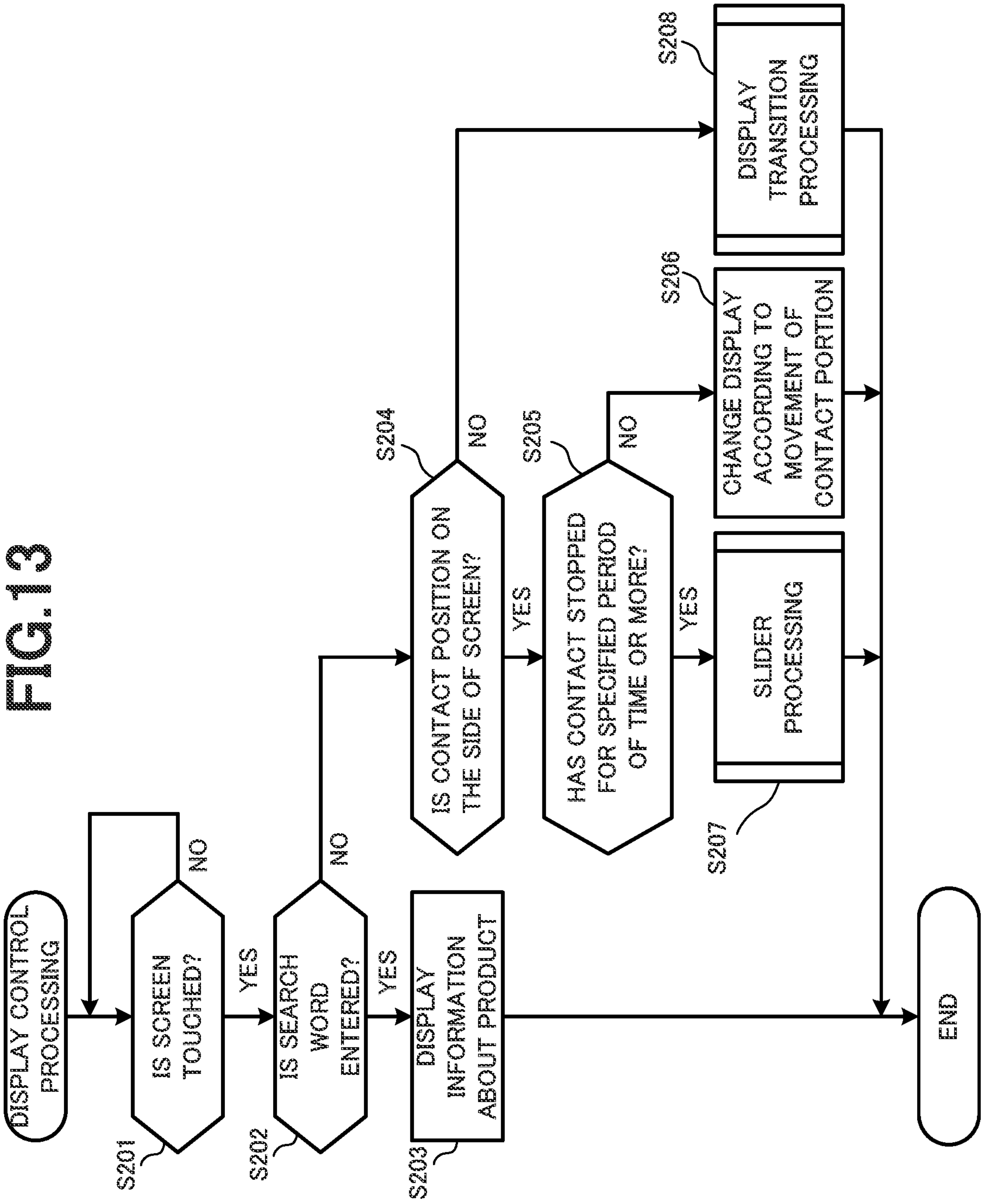
FIG. 13 is a flowchart illustrating a flow of display control processing executed by the terminal apparatus according to the embodiment of the present disclosure.
Figure 14:
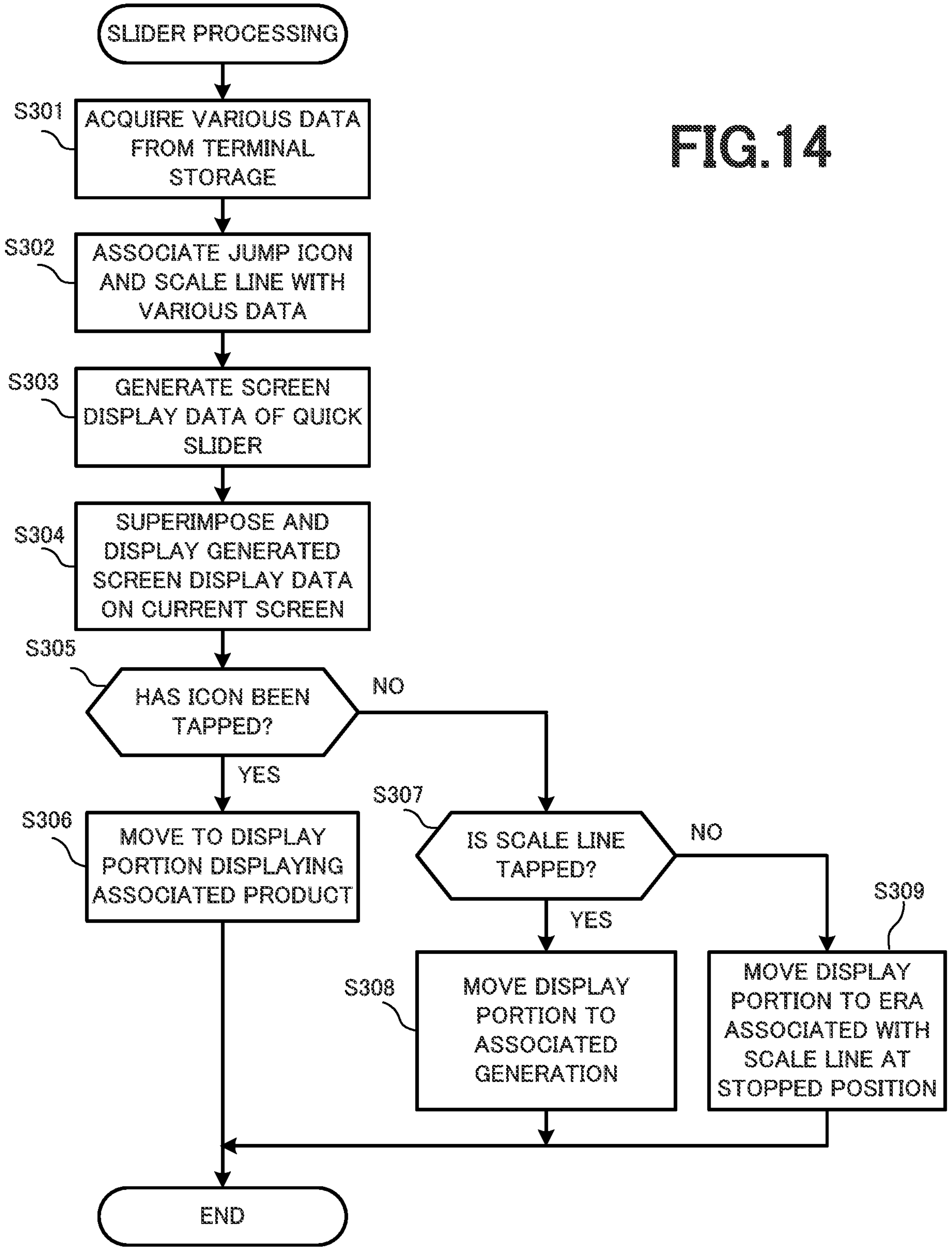
FIG. 14 is a flowchart illustrating a flow of slider processing executed by the terminal apparatus according to the embodiment of the present disclosure.
Figure 15:
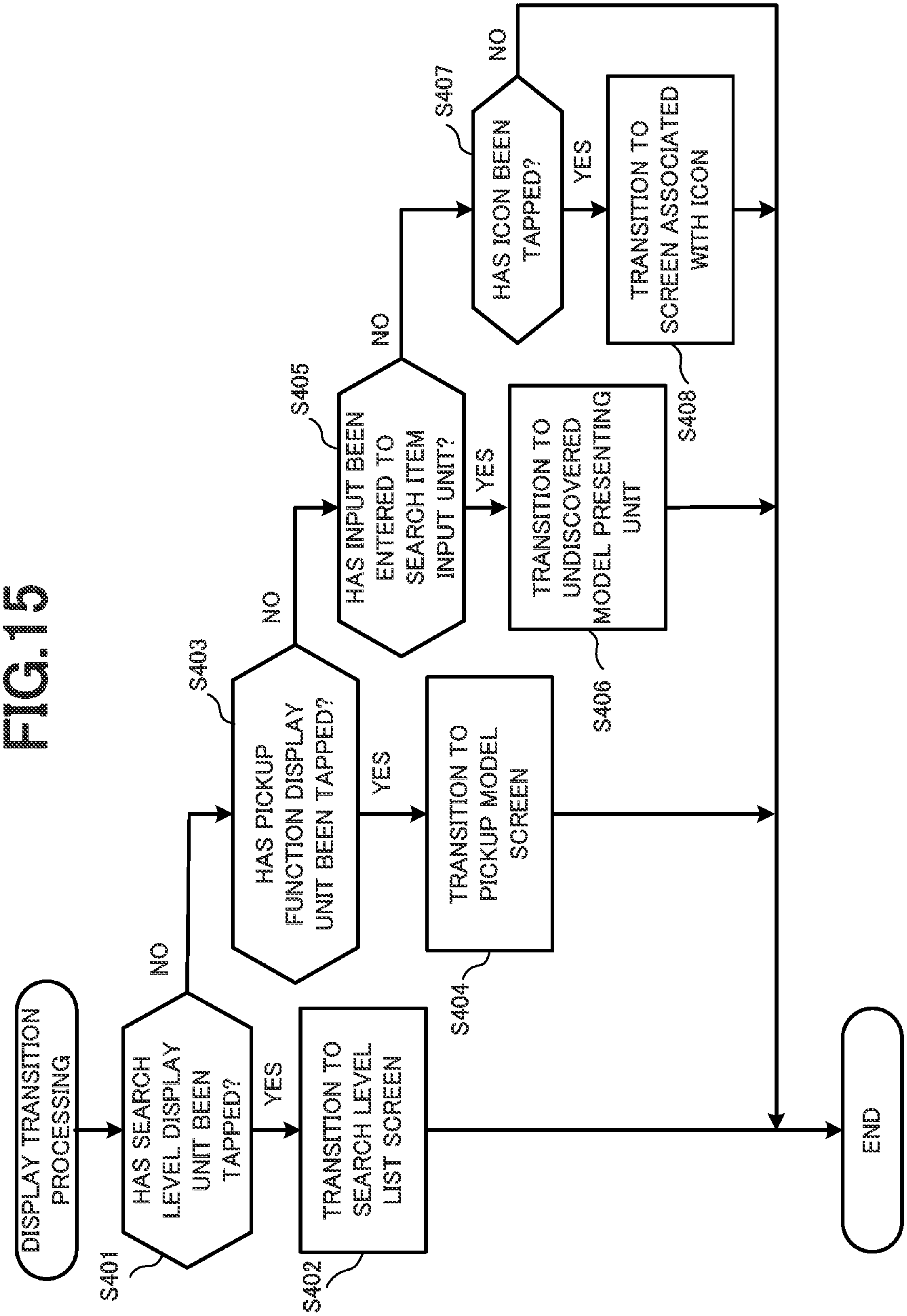
FIG. 15 is a flowchart illustrating a flow of display transition processing executed by the terminal apparatus according to the embodiment of the present disclosure.

In a case where there is an instruction to terminate the catalogue application (step S105; YES), the terminal controller 37 of the terminal apparatus 3 terminates the catalogue application (step S106). The terminal controller 37 of the terminal apparatus 3 then terminates screen display processing. In a case where there is no instruction to terminate the catalogue application (step S105; NO), the terminal controller 37 of the terminal apparatus 3 executes display control processing (step S107). The display control processing is explained with reference to the flowchart as illustrated in FIG. 13.

The terminal controller 37 of the terminal apparatus 3 determines whether the finger(s) T of the user touches the display screen of the display unit 36 (step S201). Specifically, the terminal controller 37 of the terminal apparatus 3 determines whether the finger(s) T of the user touches the startup screen 40 as illustrated in FIG. 6. In a case where the finger(s) T of the user does not touch the display screen of the display unit 36 (step S201; NO), the terminal controller 37 of the terminal apparatus 3 repeats step S201.

Also, in a case where the finger(s) T of the user touches the display screen of the display unit 36 (step S201; YES), the terminal controller 37 of the terminal apparatus 3 determines whether a search word has been entered to the search word input unit 410 on the startup screen 40 as illustrated in FIG. 6 (step S202). In a case where the search word is entered (step S202; YES), the terminal controller 37 of the terminal apparatus 3 displays information about the product searched with the search word on the display screen of the display unit 36 (step S203). Thereafter, the terminal controller 37 of the terminal apparatus 3 terminates the display control processing and returns to FIG. 12.

In a case where no search word is entered (step S202; NO), the terminal controller 37 of the terminal apparatus 3 determines whether the contact position of the finger(s) T of the user is on the side of the screen of the display unit 36 (step S204). In a case where the contact position of the finger(s) T of the user is on the side of the screen of the display unit 36 (step S204; YES), the terminal controller 37 of the terminal apparatus 3 determine whether the contact of the finger(s) T of the user has stopped for a specified period of time or more (step S205).

In a case where the contact of the finger(s) T of the user has not stopped for a specified period of time or more (step S205; NO), the terminal controller 37 of the terminal apparatus 3 changes the display according to the contact range S of the finger(s) T of the user (step S206). Specifically, in the startup screen 40 as illustrated in FIG. 6, when the user slides the contact range S of the finger(s) T in the direction of the arrow, the displayable frame D moves according to the movement. This changes the display displayed on the display unit 36 of the terminal apparatus 3.

Also, in a case where the finger(s) T of the user has stopped touching for a specified period of time or more (step S205; YES), the terminal controller 37 of the terminal apparatus 3 executes slider processing (step S207). The slider processing is hereinafter explained with reference to FIG. 14.

The terminal controller 37 of the terminal apparatus 3 as illustrated in FIG. 4 acquires various data from the terminal storage 35 of the terminal apparatus 3 (step S301). Specifically, the product information acquirer 373 included in the terminal controller 37 of the terminal apparatus 3 acquires information about the product (a product name, a model number, specifications, a thumbnail image illustrating the appearances of the product, and the like) from the product information database 351 of the terminal storage 35 as illustrated in FIG. 4. The owner information acquirer 374 included in the terminal controller 37 of the terminal apparatus 3 acquires, from the owner information database 352 of the terminal storage 35 as illustrated in FIG. 4, various registration information registered by the user when the product is purchased. The display information generator 375 included in the terminal controller 37 of the terminal apparatus 3 acquires display data (character strings, style sheets, and the like) from the display information database 353 of the terminal storage 35 as illustrated in FIG. 4. Here, the information about the product, various registration information, and display data are referred to as various data.

The display information generator 375 of the terminal controller 37 associates the jump icon 825 and the scale line included in the slider scale unit 811 of the quick slider 81 as illustrated in FIG. 11 with various data (step S302). Specifically, first, the display information generator 375 associates each scale line of the slider scale unit 811 with the generation display unit 731 that displays the year on the generation-based model display screen 70 as illustrated in FIG. 10. Next, the display information generator 375 associates the jump icon 825 with the user possession icon 751 displayed on the generation-based model display screen 70 as illustrated in FIG. 10. Furthermore, the display information generator 375 acquires the purchase date and time of the product possessed by the user from the owner information database 352 and associates it with the jump icon 825.

The display information generator 375 included in the terminal controller 37 of the terminal apparatus 3 generates screen display data of the quick slider 81 as illustrated in FIG. 11 on the basis of various data acquired in step S301 and the jump icon 825 and the scale line of the quick slider 81 associated with various data in step S302 (step S303). Specifically, first, the display information generator 375 generates screen display data for the quick slider 81 in which the slider scale unit 811 as illustrated in FIG. 11 is provided. Subsequently, the display information generator 375 acquires the purchase date and time of each product included in the owner information data acquired from the owner information database 352 of the terminal storage 35 as illustrated in FIG. 4 in step S301. The display information generator 375 arranges the jump icon 825 along the scale line of the slider scale unit 811 corresponding to the purchase date and time of each product.

The display information generator 375 transmits the generated screen display data of the quick slider 81 to the display unit 36 of the terminal apparatus 3 as illustrated in FIG. 4, and superimposes and displays it on the current screen (step S304). For example, in a case where the generation-based model display screen 70 as illustrated in FIG. 10 is displayed on the display unit 36, the quick slider 81 is superimposed and displayed on the generation-based model display screen 70 as illustrated in FIG. 11.

The terminal controller 37 of the terminal apparatus 3 determines whether the finger(s) T of the user has tapped the jump icon 825 included in the quick slider 81 (step S305). When the finger(s) T of the user taps the jump icon 825 (step S305; YES), the terminal controller 37 of the terminal apparatus 3 moves to the display portion displaying the product associated with the jump icon 825 (step S306).

In a case where the finger(s) T of the user has not tapped the jump icon 825 (step S305; NO), the terminal controller 37 of the terminal apparatus 3 determines whether the scale line of the slider scale unit 811 included in the quick slider 81 is tapped by the finger(s) T of the user (step S307). In a case where the scale line of the slider scale unit 811 is tapped by the finger(s) T of the user (step S307; YES), the terminal controller 37 of the terminal apparatus 3 moves the display portion to the era associated with the tapped scale line (step S308).

In a case where the scale line of the slider scale unit 811 is not tapped by the finger(s) T of the user (step S307; NO), the terminal controller 37 of the terminal apparatus 3 moves the display screen of the generation-based model display screen 70 to the era associated with the scale line at the position where the finger(s) T of the user has stopped (step S309). The terminal controller 37 of the terminal apparatus 3 terminates the slider processing and returns to the display control processing as illustrated in FIG. 13.

In step S204 of the display control processing as illustrated in FIG. 13, in a case where the terminal controller 37 of the terminal apparatus 3 determines that the contact position of the finger(s) T of the user is not on the side of the screen of the display unit 36 (step S204; NO), the terminal controller 37 of the terminal apparatus 3 executes the display transition processing is executed (step S208). The display transition processing is explained with reference to FIG. 15.

The terminal controller 37 of the terminal apparatus 3 determines whether the search level display unit 420 of the startup screen 40 as illustrated in FIG. 6 has been tapped by the finger(s) T of the user (step S401). When the search level display unit 420 on the startup screen 40 is tapped (step S401; YES), the terminal controller 37 of the terminal apparatus 3 transitions to the search level list screen 51 as illustrated in FIG. 7 (step S402).

In a case where the search level display unit 420 on the startup screen 40 is not tapped (step S401; NO), the terminal controller 37 of the terminal apparatus 3 determines whether the pickup function display unit 430 included in the startup screen 40 as illustrated in FIG. 6 has been tapped by the finger(s) T of the user (step S403).

In a case where the pickup function display unit 430 is tapped by the finger(s) T of the user (step S403; YES), the terminal controller 37 of the terminal apparatus 3 transitions to the pickup model screen 61 as illustrated in FIG. 8 (step S404). Also, in a case where the pickup function display unit 430 is not tapped by the finger(s) T of the user (step S403; NO), the terminal controller 37 of the terminal apparatus 3 displays the startup screen 40 as illustrated in FIG. 6 determines whether the user has entered the series name, model name, or the like of the product in the included search item input unit 440 (step S405).

In a case where the user has entered the series name, model name, or the like of the product to the search item input unit 440 (step S405; YES), the terminal controller 37 of the terminal apparatus 3 transitions to the undiscovered model presenting screen 65 as illustrated in FIG. 9 (step S406). Also, in a case where the user has not entered the series name, model name, or the like of the product to the search item input unit 440 (step S405; NO), the terminal controller 37 of the terminal apparatus 3 determines whether the finger(s) T of the user has tapped the icon (step S407).

For example, the terminal controller 37 of the terminal apparatus 3 determines whether any one of the first category model icon 452 of the first category display unit 450 to the third category model icon 472 of the third category display unit 470 included in the startup screen 40 as illustrated in FIG. 6 has been tapped with the finger(s) T of the user. In a case where the finger(s) T of the user taps the icon (step S407; YES), the terminal controller 37 of the terminal apparatus 3 transitions to the screen associated with the icon tapped with the finger(s) T of the user (step S408).

For example, it is assumed that the first category model icon 452 of the first category display unit 450 included in the startup screen 40 as illustrated in FIG. 6 is tapped with the finger(s) T of the user. In this case, transition is made to the generation-based model display screen 70 that summarizes according to the released era, and the displayable frame D moves such that the product corresponding to the tapped first category model icon 452 is displayed on the display unit 36 of the terminal apparatus 3. In a case where the finger(s) T of the user has not tapped the icon (step S407; NO), the terminal controller 37 of the terminal apparatus 3 terminates the display transition processing and returns to the display control processing as illustrated in FIG. 13.

The terminal controller 37 of the terminal apparatus 3 terminates the display control processing and returns to step S105 of the screen display processing as illustrated in FIG. 12. The terminal controller 37 of the terminal apparatus 3 executes the processing of step S105 and subsequent steps.

As described above, according to the information processing method of the present embodiment, by tapping the jump icon 825 of the quick slider 81 superimposed on the screen of the catalogue displayed on the display unit 36 of the terminal apparatus 3, transition can be made to the display screen of the product that is possessed by the user associated with to the jump icon 825. Also, by tapping the scale line of the quick slider 81, transition can be made to the display screen of the product of the era associated with the scale line. This makes it easy to understand the posting position of the product that possessed by the user on the catalogue, and improves the viewability of the catalogue.

Modified Example

Figure 16:
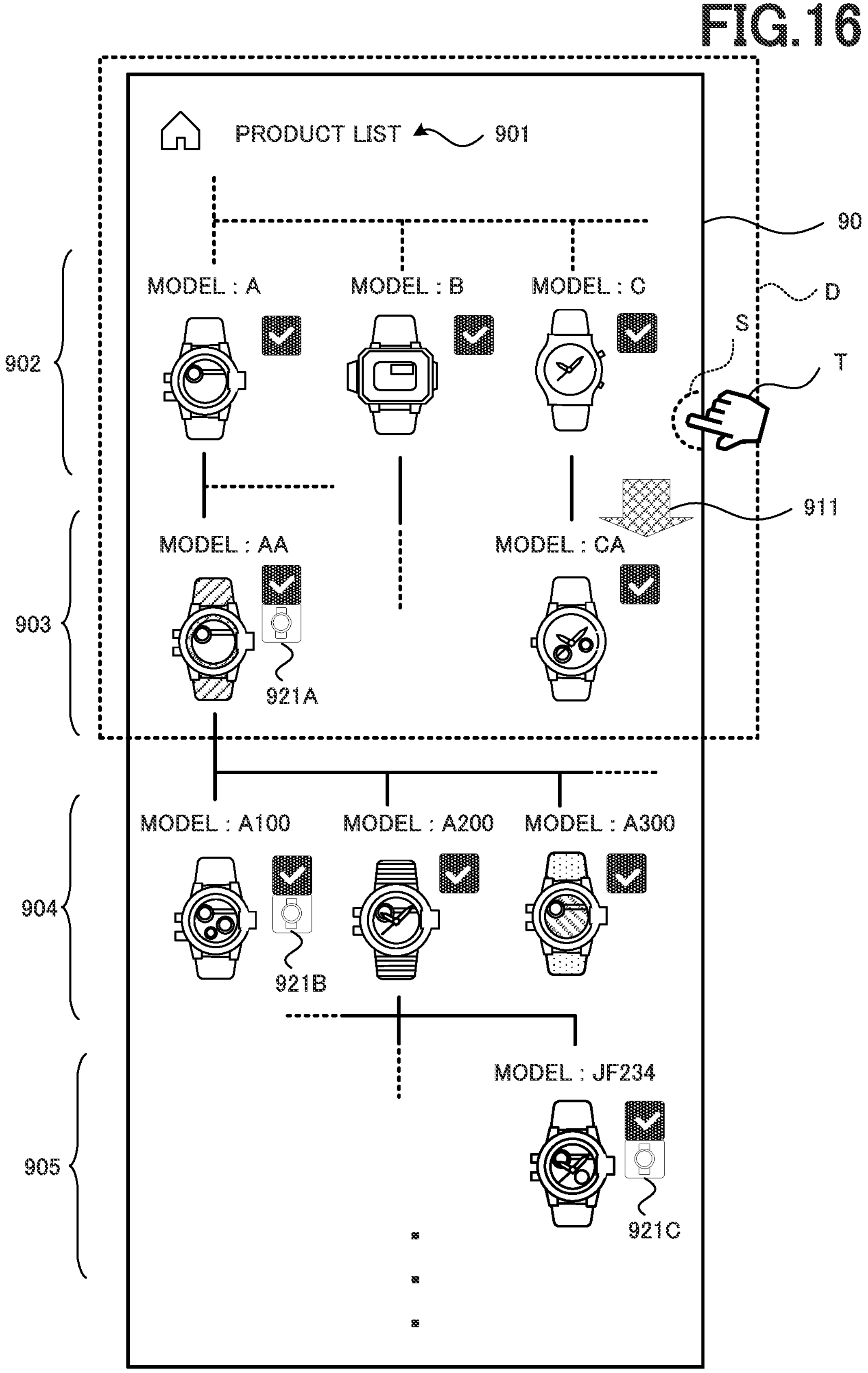
FIG. 16 is a diagram illustrating a configuration of a tree diagram display screen of a catalogue application according to a modified example of the embodiment of the present disclosure.

In the above embodiment, the startup screen 40 as illustrated in FIG. 6 includes items such as the search level display unit 420 and the pickup function display unit 430. In addition to these items, items that can be transitioned to the tree diagram display screen 90 that displays multiple products in a tree diagram may be included. FIG. 16 is a diagram illustrating a configuration of the tree diagram display screen 90.

The tree diagram display screen 90 includes a title display unit 901, a first item display unit 902, a second item display unit 903, a third item display unit 904, and a fourth item display unit 905. The title display unit 901 relates to the content indicated by the tree diagram. In this case, this is assumed to be "product list". The first item display unit 902 displays items of the top level in the tree diagram. The second item display unit 903 displays items of a lower level than the first item display unit 902. The third item display unit 904 displays items in a lower level than the second item display unit 903. The fourth item display unit 905 displays items in a lower level than the third item display unit 904.

Each of the first item display unit 902 to the fourth item display unit 905 displays item names and thumbnail images indicating the appearances of the products belonging to the corresponding item names. Each thumbnail image has a confirmation icon that indicates whether the user has viewed the product. In a case where the user possesses the product, the user possession icons 921A, 921B, and 921C are attached to indicate that the user possesses the product. In the following, the user possession icons 921A, 921B, and 921C are collectively referred to as a user possession icon 921.

The tree diagram display screen 90, like the other screens, is made larger than the display screen of the display unit 36 of the terminal apparatus 3. A displayable frame D indicated by dotted lines in FIG. 16 indicates a displayable range on the display screen of the display unit 36 of the terminal apparatus 3. When the user touches the display screen of the display unit 36 with the finger(s) T, a pointing arrow 911 is displayed. The pointing arrow 911 indicates that there is a product possessed by the user in the direction of the arrow.

For example, in FIG. 16, the range of the displayable frame D includes a first item display unit 902 and a second item display unit 903. The third item display unit 904 and the fourth item display unit 905, which are not included in the displayable frame D, have products with user possession icons 921 attached. In this case, the pointing arrow 911 is displayed pointing in the direction of the third item display unit 904 and the fourth item display unit 905 that are not included in the range of the displayable frame D.

When the user slides the finger(s) T in the direction indicated by the pointing arrow 911, the contact range S of the finger(s) T of the user moves according to the movement. The displayable frame D moves according to the direction in which the contact range S moves. As a result, the product with the user possession icon 921 can be displayed on the display screen of the display unit 36 of the terminal apparatus 3.

Moreover, the present disclosure is not limited to the above embodiment, and it should be understood that various modifications are possible without departing from the gist of the present disclosure.

In the above embodiment, the user possession icon 751 as illustrated in FIG. 10 is attached to the product possessed by the user. The present disclosure is not limited thereto. In addition to the user possession icon 751, the purchase date of the product may be displayed. Similarly, for the jump icon 825 included in the quick slider 81 as illustrated in FIG. 11, not only the jump icon 825 but also the purchase date of the product may be displayed.

In addition, the user possession icon 751 and the jump icon 825 may be displayed according to the design of the watch, i.e., the product. For example, icons with various designs such as a round model, a square model, and a triple chronograph model can be displayed according to the shape of the display unit of the watch.

Furthermore, various data stored in the owner information database 352 included in the terminal storage 35 of the terminal apparatus 3 as illustrated in FIG. 4 may be analyzed and calculated with a predetermined algorithm, and recommended products may be presented to the user. In this case, icons indicating the recommended products may be provided next to the first member product icon 732A to the seventh member product icon 762C as illustrated in FIG. 10 and above the quick slider 81 as illustrated in FIG. 11.

Furthermore, in the above embodiment, the products displayed in the catalogue are, for example, wrist watches. The present disclosure is not limited thereto. Data of pictures that can be individually identified, for example, painting data individually managed by non-fungible token (NFT), Gacha cards (in-game lottery cards) for game applications, and the like, which are not "things" per se, may also be used to be displayed as products in the catalogue.

Furthermore, in the above embodiment, it is assumed that change of the display range, screen transition, each processing with the quick slider 81, and the like are performed according to an operation input with the finger(s) T of the user touching the display screen of the display unit 36 of the terminal apparatus 3. The present disclosure is not limited thereto. A touch input device such as a stylus may be used instead of the finger(s) T of the user. Furthermore, the same operation as the operation input from the finger(s) T of the user may be performed according to an operation input from various operation input devices such as a mouse, a keyboard, and a joystick.

Furthermore, in the above embodiment, it is assumed that, when the jump icon 825 placed on the quick slider 81 is tapped with the finger(s) T of the user, the display screen of the generation-based model display screen 70 displaying the product associated with the jump icon 825 is displayed. The present disclosure is not limited thereto. When tapping with the finger(s) T of the user, a display screen that displays the content of the product associated with the jump icon 825 may be opened. For example, like the pickup model screen 61 as illustrated in FIG. 8 and the undiscovered model presenting screen 65 as illustrated in FIG. 9, a display screen describing information about the product such as a thumbnail image illustrating the appearance of the product, the model number of the product, the model name, explanation about the function and the configuration, and the like may be opened.

Furthermore, how a program according to the present embodiment is implemented is not particularly limited. For example, a program can be implemented by storing the program in a computer-readable storage medium such as a flexible disk, a compact disc (CD)-ROM, a digital versatile disc (DVD)-ROM, or a memory card. Furthermore, a program can be carried by carrier waves and implemented with a communication medium such as the Internet. For example, the program may be posted and distributed on a bulletin board system (BBS) on a communication network. Then, the above processing may be executed by starting the display selection processing program and executing the display selection processing program in the same way as other application programs under the control of the operating system (OS).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information processing method executed by a processor, wherein the information processing method comprises:

receiving information about previously purchased products associated with a user from a database;

controlling a display to display:

a display range of a display screen;

a plurality of products within the display range of the display screen, each of the plurality of products being associated with chronological information;

a slider in an overlapping manner on the plurality of products within the display range of the display screen, wherein the slider includes:

a slider scale containing a plurality of markers each representing different chronological information; and at least one icon, wherein each of the at least one icon represents a previously purchased product based on the received information about previously purchased products associated with the user;

controlling the display to change the display range of the display screen displayed on the display based on an amount of an operation of the slider scale by the user;

controlling the display to display the at least one icon in accordance with a marker of the plurality of markers representing the chronological information associated with a product corresponding to the icon purchased on a date matching the chronological information represented by the marker among the plurality of markers; and in response to selection of an icon of the at least one icon by the user, transitioning the display to a position corresponding to the product associated with the selected icon among the plurality of products such that information about the product is displayed within the display range.

2. The information processing method according to claim 1, wherein the product purchased by the user is a product possessed by the user.

3. The information processing method according to claim 1, wherein the slider includes a scale line associated with particular information about the product, and wherein the information processing method further comprises, in response to selection of the scale line by the user, transitioning to information about the product associated with the scale line.

4. The information processing method according to claim 3, wherein the information processing method further comprises controlling, in response to a slide operation performed by the user on the scale line, transition to the information about the product associated with the scale line situated at a position where the slide operation performed by the user has stopped.

5. The information processing method according to claim 4, further comprising:

controlling, in response to a slide operation performed by the user with a finger on the scale line, the display to display transition to the information about the product associated with the scale line situated at a position where the finger of the user has stopped.

6. The information processing method according to claim 3, wherein the scale line is associated with a year when the product was sold.

7. The information processing method according to claim 1, comprising:

controlling the display to in response to selection of the icon by the user, transition to a display screen displaying the information about the product.

8. The information processing method according to claim 1, further comprising:

controlling the display to display a user possession icon indicating that the product is possessed by the user and a user view icon indicating that the user has viewed the product; and, in a case where the user has viewed the product, changing a color or a shape of the user view icon in a manner differently from that in a case where the user has not viewed the product.

9. The information processing method according to claim 1, further comprising:

controlling the display to display list information about the products that illustrates a total number of products and a number of products viewed by the user.

10. The information processing method according to claim 1, wherein controlling the display to change the display range based on the amount of the operation of the slider scale comprises:

determine an amount of change in a contact position on the display screen while a contact with the display screen is kept; and controlling the display to change the display range of the display screen based on the amount of change in the contact position on the display screen while the contact with the display screen is kept, and wherein controlling the display to display the information about the product registered by the user associated with the icon, in response to selection of the icon comprises controlling the display to transition directly from display of a currently-displayed display range of the display screen to an arbitrary display range of the display screen, the arbitrary display range displaying information about the product registered by the user associated with the icon.

11. An information processing apparatus comprising:

a processor configured to:

receive information about previously purchased products associated with a user from a database;

control a display to display:

a display range of a display screen;

a plurality of products within the display range of the display screen, each of the plurality of products being associated with chronological information;

a slider in an overlapping manner on the plurality of products within the display range of the display screen, wherein the slider includes:

a slider scale containing a plurality of markers each representing different chronological information; and at least one icon, wherein each of the at least one icon represents a previously purchased product based on the received information about previously purchased products associated with the user;

control the display to change the display range of the display screen displayed on the display based on an amount of an operation of the slider scale by the user;

control the display to display the at least one icon in accordance with a marker of the plurality of markers representing the chronological information associated with a product corresponding to the icon purchased on a date matching the chronological information represented by the marker among the plurality of markers; and in response to selection of an icon of the at least one icon by the user, transition the display to a position corresponding to the product associated with the selected icon among the plurality of products such that information about the product is displayed within the display range.

12. The information processing apparatus according to claim 11, wherein the processor is configured to control the display to display list information about products.

13. A non-transitory computer-readable recording medium storing a program for causing a computer to execute:

receiving information about previously purchased products associated with a user from a database;

controlling a display to display:

a display range of a display screen;

a plurality of products within the display range of the display screen, each of the plurality of products being associated with chronological information;

a slider in an overlapping manner on the plurality of products within the display range of the display screen, wherein the slider includes:

a slider scale containing a plurality of markers each representing different chronological information; and at least one icon, wherein each of the at least one icon represents a previously purchased product based on the received information about previously purchased products associated with the user;

controlling the display to change the display range of the display screen displayed on the display based on an amount of an operation of the slider scale by the user;

controlling the display to display the at least one icon in accordance with a marker of the plurality of markers representing the chronological information associated with a product corresponding to the icon purchased on a date matching the chronological information represented by the marker among the plurality of markers; and in response to selection of an icon of the at least one icon by the user, transitioning the display to a position corresponding to the product associated with the selected icon among the plurality of products such that information about the product is displayed within the display range.

14. An information processing method executed by a processor of a terminal apparatus comprising an operation input unit configured to receive a slide operation and a display, wherein the information processing method comprises:

displaying a plurality of products that are each associated with chronological information in a first display area on the display;

displaying a slider in an overlapping manner on the plurality of products within the first display area on the display, the slider including a slider scale containing a plurality of markers each representing different chronological information in a second display area on the display; and displaying, in the second display area, a first icon of a product purchased by a user among the plurality of products, in accordance with a marker representing the chronological information associated with the product corresponding to the first icon purchased on a date matching the chronological information represented by the marker among the plurality of markers.

15. The information processing method according to claim 14, wherein each of the plurality of products is associated with the chronological information that is information of a release year of the product.

16. The information processing method according to claim 14, wherein the chronological information associated with the first icon corresponds to a year of purchase of the product corresponding to the first icon by the user.

17. The information processing method according to claim 14, further comprising:

displaying, in the first display area, the product associated with the chronological information represented by the marker situated at a position where the slide operation performed by the user has stopped, in response to receiving the slide operation performed by the user within the second display area.

18. The information processing method according to claim 14, further comprising:

displaying, in the first display area, information about the product purchased by the user and associated with the first icon, in response to selection of the first icon by the user.

19. The information processing method according to claim 18, further comprising:

displaying the information about the product purchased by the user in the first display area includes displaying a second icon associated with the product purchased by the user while associating with the information about the product purchased by the user.

* * * * *